US008792731B2

(12) United States Patent
Fukuda

(10) Patent No.: US 8,792,731 B2
(45) Date of Patent: Jul. 29, 2014

(54) IMAGE PROCESSING APPARATUS, IMAGE DATA PROCESSING METHOD, AND STORAGE MEDIUM

(75) Inventor: Yasuo Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 13/475,116

(22) Filed: May 18, 2012

(65) Prior Publication Data

US 2012/0301038 A1 Nov. 29, 2012

(30) Foreign Application Priority Data

May 26, 2011 (JP) .................................. 2011-118396

(51) Int. Cl.
*G06K 9/00* (2006.01)
(52) U.S. Cl.
USPC .......................................... 382/224; 382/181
(58) Field of Classification Search
USPC ................................................. 382/181–231
See application file for complete search history.

(56) References Cited

U.S. PATENT DOCUMENTS

| 5,689,584 | A | * | 11/1997 | Kobayashi | .................... | 382/190 |
| 5,787,201 | A | * | 7/1998 | Nelson et al. | ................. | 382/224 |
| 5,821,929 | A | | 10/1998 | Shimizu et al. | | |
| 6,507,678 | B2 | * | 1/2003 | Yahagi | .......................... | 382/305 |
| 7,079,689 | B2 | | 7/2006 | Fukuda | | |
| 7,835,549 | B2 | * | 11/2010 | Kitamura et al. | ............. | 382/118 |
| 8,472,668 | B2 | * | 6/2013 | Hu | ................. | 382/103 |
| 2007/0122010 | A1 | * | 5/2007 | Kitamura et al. | ............. | 382/118 |
| 2009/0324060 | A1 | * | 12/2009 | Sato et al. | ..................... | 382/159 |

OTHER PUBLICATIONS

Yang, et al., "Detecting Faces in Images: A Survey," IEEE Trans. on PAMI, vol. 24, No. 1, pp. 34-58, Jan. 2002.
Viola, et al., "Robust Real-time Object Detection," in Proc. of IEEE Workshop SCTV, Jul. 2001.

* cited by examiner

*Primary Examiner* — Alex Liew
(74) *Attorney, Agent, or Firm* — Fitzpatrick, Cella, Harper & Scinto

(57) ABSTRACT

An image processing apparatus includes an instruction unit for designating one of a plurality of partial images and instructing execution of one of a plurality of processes for a classification process to determine whether the designated partial image contains a specific pattern, an execution unit for performing the instructed process for the designated partial image using parameters, and a determination unit for determining whether the classification process for the designated partial image has terminated. When the determination unit determines that the classification process has not terminated for at least one of the partial images, the instruction unit designates one of the partial images for which the classification process has not terminated and outputs a re-instruction for execution of an unexecuted process for the designated partial image. The execution unit executes, using different parameters, the instructed process for the designated partial image.

14 Claims, 19 Drawing Sheets

IMAGE PROCESSING APPARATUS, IMAGE DATA PROCESSING METHOD, AND STORAGE MEDIUM

BACKGROUND OF THE INVENTION

1. Field of the Invention

The present invention relates to an image processing apparatus, image data processing method, and storage medium. Particularly, the present invention relates to a technique of detecting a specific object captured in an image.

2. Description of the Related Art

An image processing method of automatically detecting a specific object pattern from an image is useful and applicable to, for example, determine a human face. This method can be used in many fields including a teleconference, a man-machine interface, a security system, a monitor system for tracking a human face, and an image compression technique. As a technique of detecting a face from an image, various methods are mentioned in non-patent literature 1 (M. H. Yang, D. J. Kriegman and N. Ahuja, "Detecting Faces in Images: A Survey," IEEE Trans. on PAMI, vol. 24, no. 1, pp. 34-58, January, 2002).

In particular, an AdaBoost-based method by Viola et al., which is described in non-patent literature 2 (P. Viola and M. Jones, "Robust Real-time Object Detection," in Proc. of IEEE Workshop SCTV, July, 2001), is widely used in face detection research because of a high execution speed and high detection ratio. The AdaBoost-based method increases the classification process speed by series-connecting different simple classification process filters, and when it is determined that the target region is a non-face region during the classification process, aborting a subsequent classification process. To further increase the classification process speed, classification processes may be parallel-executed or pipelined. However, because the process is aborted in accordance with the contents of image data or the like, this makes it difficult to schedule the classification process. Especially when the classification process is implemented by hardware, it needs to be implemented by utilizing limited resources at higher efficiency. The difficulty of scheduling becomes a serious challenge.

This problem will be explained in more detail by exemplifying a face detection process using a Boosting algorithm. FIG. 2 is a view showing a face detection process algorithm using the Boosting algorithm. In FIG. 2, a window image 201 is a partial image which forms input image data. The window image 201 contains an image region to be referred to by weak classifiers 210 to 250 (to be described later).

The weak classifier 210 refers to some or all pixel values of the window image 201, performs a predetermined calculation process for the pixel values, and determines whether the window image 201 contains a detection target object (for example, a human face region). Parameters such as coefficients used in the predetermined calculation are determined by machine learning prior to an actual detection process.

The weak classifiers 211 to 250 can also execute the same calculation process as that by the weak classifier 210. However, the reference position and reference range of the window image 201 to be referred to by the weak classifier 210, and parameters such as coefficients used in calculation by the weak classifier 210 are preferably changed. The weak classifiers 211 to 250 can execute almost the same process as that by the weak classifier 210 except that the reference position and range of the window image 201, and parameters such as coefficients used in calculation are different. In FIG. 2, N weak classifiers (weak classifiers 210 to 250) are series-connected. Each of the weak classifiers 210 to 250 determines PASS or NG in accordance with the calculation result. The process starts from the 0th weak classifier 210, and if the determination result is PASS, the next weak classifier 211 performs the determination process. In this way, the process proceeds sequentially. If the determination result of the weak classifier 250 serving as the final weak classifier is also PASS, it is determined that the window image 201 contains the detection target object (face). If NG is determined in the determination process by one of the N weak classifiers, a subsequent process is aborted, and it is determined that the window image 201 does not contain the detection target object (face).

FIG. 3 exemplifies a case in which an output from each weak classifier is not a binary value of PASS or NG, but a ternary value of OK (partial image contains a detection target object (face)), PASS, or NG. In FIG. 3, the same reference numerals as those in FIG. 2 denote the same parts, and a description thereof will not be repeated. Weak classifiers 310 to 350 are different from the weak classifiers 210 to 250 in FIG. 2 in that the output is a ternary value, as described above. If it is determined in the determination process by one of the N weak classifiers 310 to 350 that the partial image contains a detection target object (face) (determination result "OK"), the determination process is aborted because no subsequent determination process need be performed. This is different from the weak classifiers explained with reference to FIG. 2. The remaining process by the N weak classifiers 310 to 350 is the same as that by the weak classifiers described with reference to FIG. 2.

The face detection process is implemented by repetitively executing the determination process by the weak classifiers. At this time, if it is configured to finalize determination results as many as possible at the beginning of a series of weak classifiers, the expected value of the total process count of the weak classifiers can be suppressed small. Also, reduction of the calculation amount of the weak classifiers and an increase in process speed can be expected as a whole.

However, the average calculation amount can be reduced in the above way in terms of the algorithm. However, when processes are pipelined to further increase the speed, it becomes difficult to schedule the processes because process amounts for respective windows are not uniform.

SUMMARY OF THE INVENTION

The present invention provides a technique capable of efficiently performing a classification process for input image data by series-connecting a plurality of weak classifiers.

According to one aspect of the present invention, there is provided an image processing apparatus comprising: an instruction unit adapted to designate one of a plurality of partial images and instruct execution of one of a plurality of processes for a classification process to determine whether the designated partial image contains a specific pattern; an execution unit adapted to perform, in accordance with the instruction from the instruction unit, the instructed process for the designated partial image using parameters for the classification process, including a threshold for determining whether to continue or terminate the classification process; and a determination unit adapted to determine, based on a result of execution by the execution unit, whether the classification process for the designated partial image has terminated, wherein when the determination unit determines that the classification process has not terminated for at least one of the plurality of partial images, the instruction unit designates one of the partial images for which the classification process are determined not to have terminated and outputs a re-instruction for execution of unexecuted one of the plurality of processes for the designated partial image, and in accordance with the re-instruction, the execution unit executes, using parameters different from the parameters previously used, the instructed process for the designated partial image.

According to another aspect of the present invention, there is provided an image data processing method to be executed by an image processing apparatus, comprising: an instruction step of designating one of a plurality of partial images and instructing execution of one of a plurality of processes for a classification process to determine whether the designated partial image contains a specific pattern; an execution step of performing, in accordance with the instruction in the instruction step, the instructed process for each of the designated partial image using parameters for the classification process, including a threshold for determining whether to continue or terminate the classification process; and a determination step of determining, based on a result of execution in the execution step, whether the classification process for the designated partial image has terminated, wherein in the instruction step, when the classification process is determined in the determination step not to have terminated for at least one of the plurality of partial images, one of the partial images for which the classification process are determined not to have terminated is designated and a re-instruction for execution of unexecuted one of the plurality of processes for the designated partial image is output, and in the execution step, in accordance with the re-instruction, the instructed process for the designated partial image is executed using parameters different from the parameters previously used.

The present invention can efficiently perform a classification process for input image data by series-connecting a plurality of weak classifiers.

Further features of the present invention will become apparent from the following description of exemplary embodiments (with reference to the attached drawings).

BRIEF DESCRIPTION OF THE DRAWINGS

FIG. 12 is a view exemplifying a process by a weak classifier;

FIG. 13 is a view exemplifying a process by the weak classifier;

FIG. 14 is a view exemplifying a process by the weak classifier;

DESCRIPTION OF THE EMBODIMENTS

First Embodiment

Figure 1:
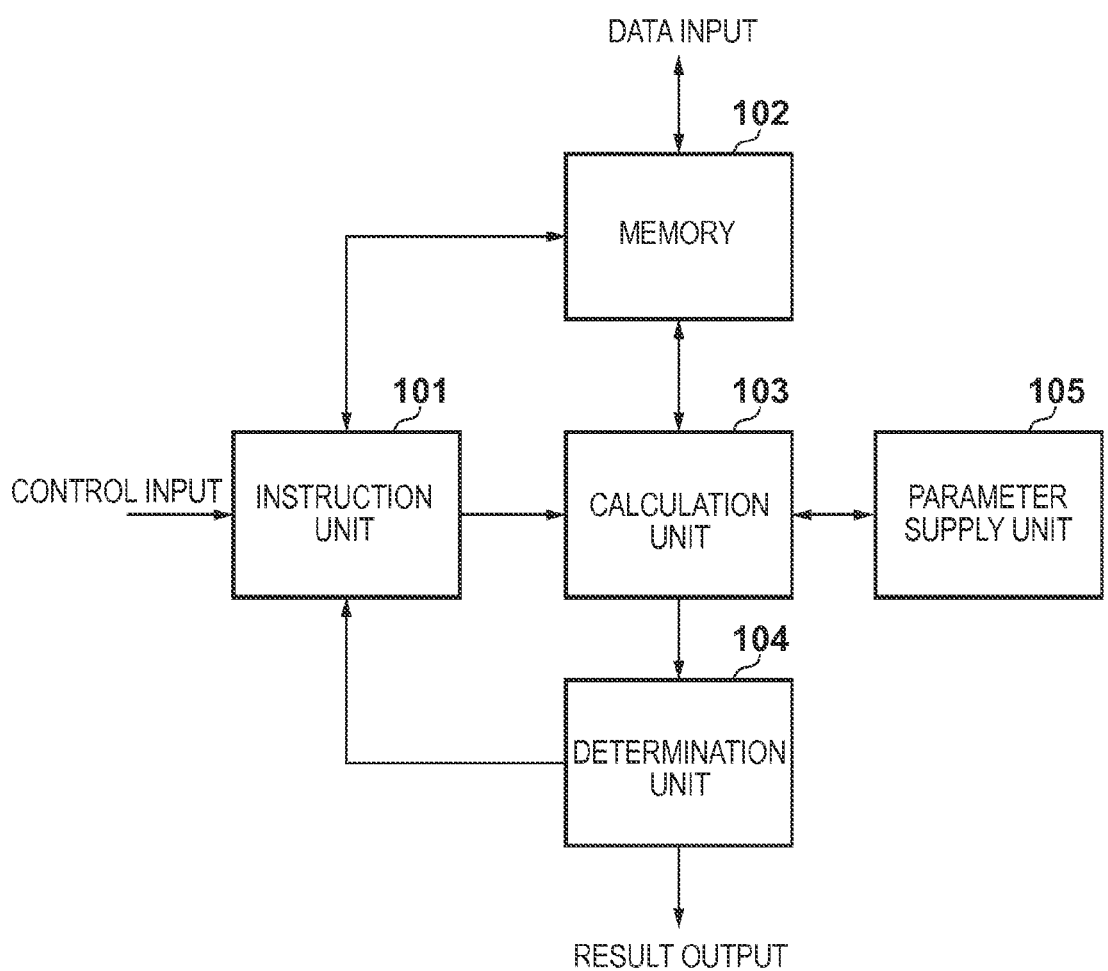
FIG. 1 is a block diagram exemplifying the arrangement of an image processing apparatus according to an embodiment.

The first embodiment of the present invention will be described in detail with reference to the accompanying drawings. FIG. 1 is a block diagram showing the schematic arrangement of an image processing apparatus which implements an image processing method according to the embodiment. In FIG. 1, an instruction unit 101 manages the schedule of image processes for respective partial images. The instruction unit 101 receives an external control input (image process start instruction), and starts an image process. The instruction unit 101 can receive/output data from/to a memory 102. The instruction unit 101 can output data to a calculation unit 103, and receive data from a determination unit 104.

Figure 2:
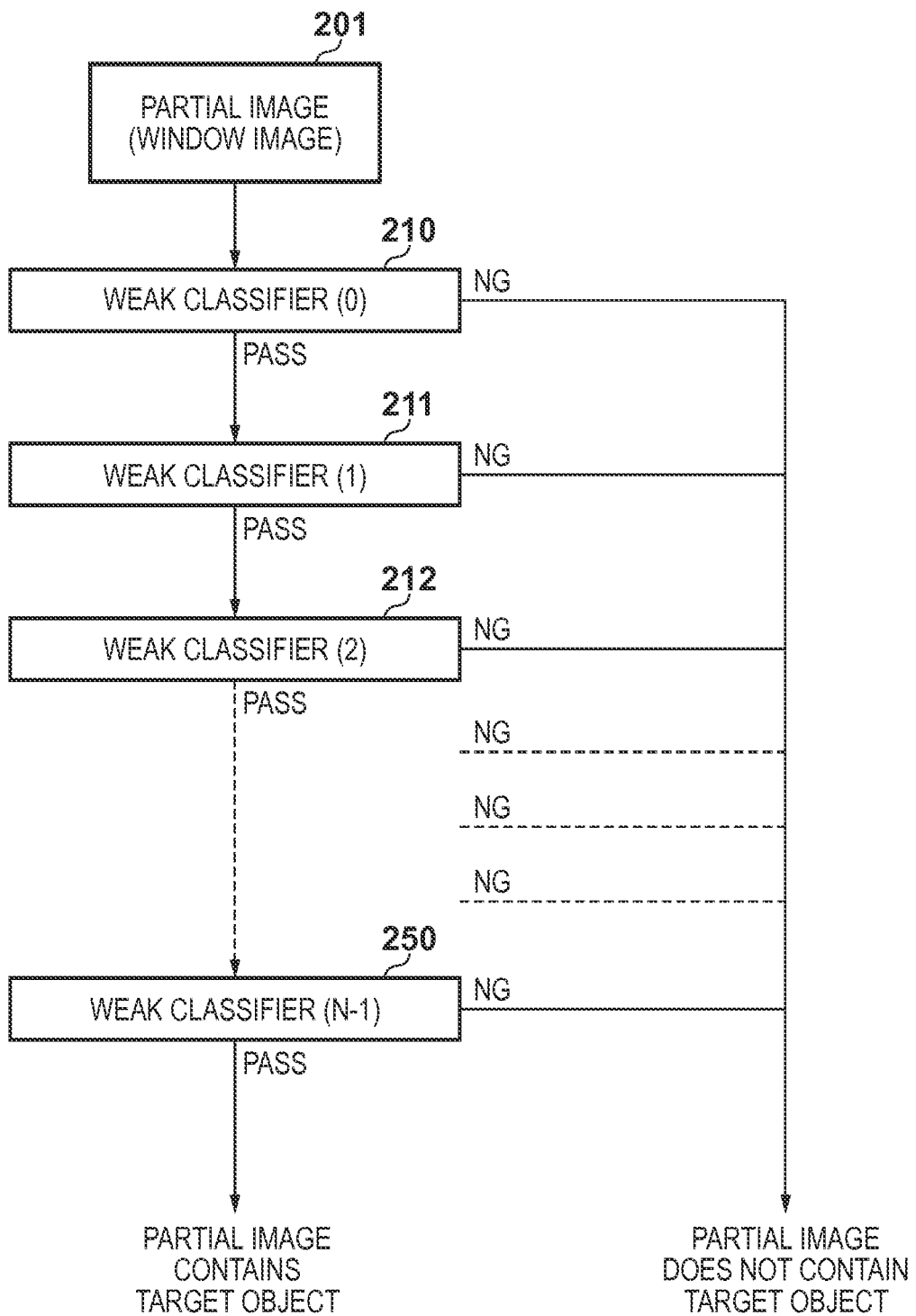
FIG. 2 is a view for explaining an example of a detection process using the Boosting algorithm.

The memory 102 can hold, for example, a plurality of window images 201 in FIG. 2. The memory 102 can transmit an image data request to the outside, acquire image data, and hold the acquired image data. Further, the memory 102 can receive an instruction from the instruction unit 101 and send back a response. The memory 102 can receive an image data request from the calculation unit 103, and output the requested image data to the calculation unit 103. The memory 102 may have a storage capacity large enough to simultaneously store all image data to be detected. However, the storage capacity for holding all image data to be detected is not always necessary. The memory 102 suffices to hold a plurality of window images. For example, the memory 102 has a storage capacity capable of storing partial images obtained by dividing image data to be detected into bands or blocks. The memory 102 can replace some or all image data held in the memory 102 in accordance with an instruction from the instruction unit 101. In this case, the memory 102 transmits an image data request to the outside in accordance with an instruction from the instruction unit 101, and upon completion of receiving (acquiring) image data, sends back a response to the instruction unit 101.

The calculation unit 103 can execute the process of at least one weak classifier. The calculation unit 103 can transmit an image data request to the memory 102, and refer to image data (a plurality of partial image data) transmitted from the memory 102. A parameter supply unit 105 holds parameters to be used by the weak classifier for the classification process. The parameter supply unit 105 can transmit parameters in response to a request from the calculation unit 103. The calculation unit 103 can transmit a parameter request to the parameter supply unit 105, and refer to parameters transmitted from the parameter supply unit 105. The determination unit 104 receives an output from the calculation unit 103, determines it, and outputs the determination result. At this time, the determination unit 104 also transmits the determination result to the instruction unit 101.

Figure 11:
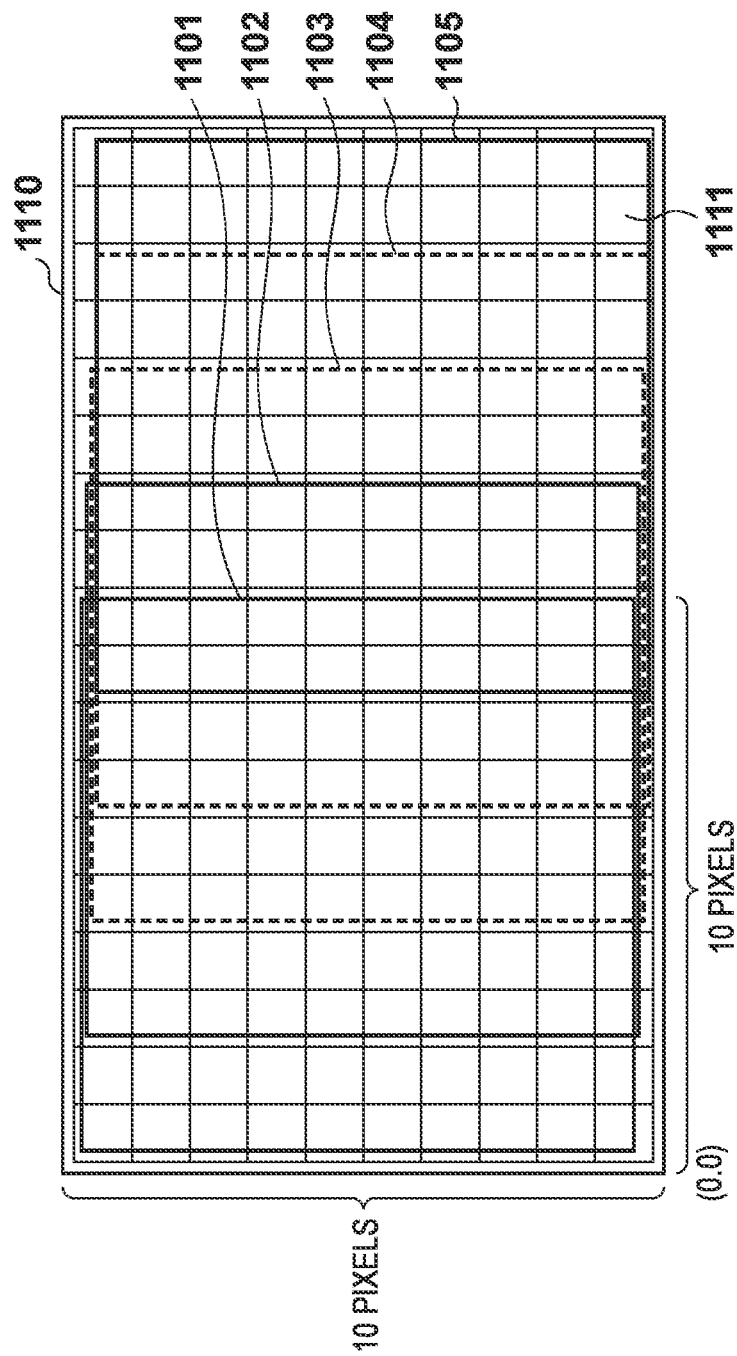
FIG. 11 is a view exemplifying a window image.

A plurality of window images held in the memory 102 will be exemplified with reference to FIG. 11. A memory area 1110 is an area which can be referred to by the calculation unit 103 from the memory 102. Each smallest rectangular area 1111 in the memory area 1110 represents each pixel data. A plurality of window images 1101 to 1105 are set in the memory area 1110. For example, the window image 1101 exists in an area of 10 pixels×10 pixels from a position (0, 0) of the memory area 1110. Similarly, the window image 1102 exists in an area of 10 pixels×10 pixels from a position (0, 2) of the memory area 1110. The window image 1103 exists in an area of 10 pixels×10 pixels from a position (0, 4) of the memory area 1110. The window image 1104 exists in an area of 10 pixels×10 pixels from a position (0, 6) of the memory area 1110. The window image 1105 exists in an area of 10 pixels×10 pixels from a position (0, 8) of the memory area 1110. The window images 1101 to 1105 correspond to the window image 201 in FIG. 2, but differ in the position of the original image.

Figure 16A:
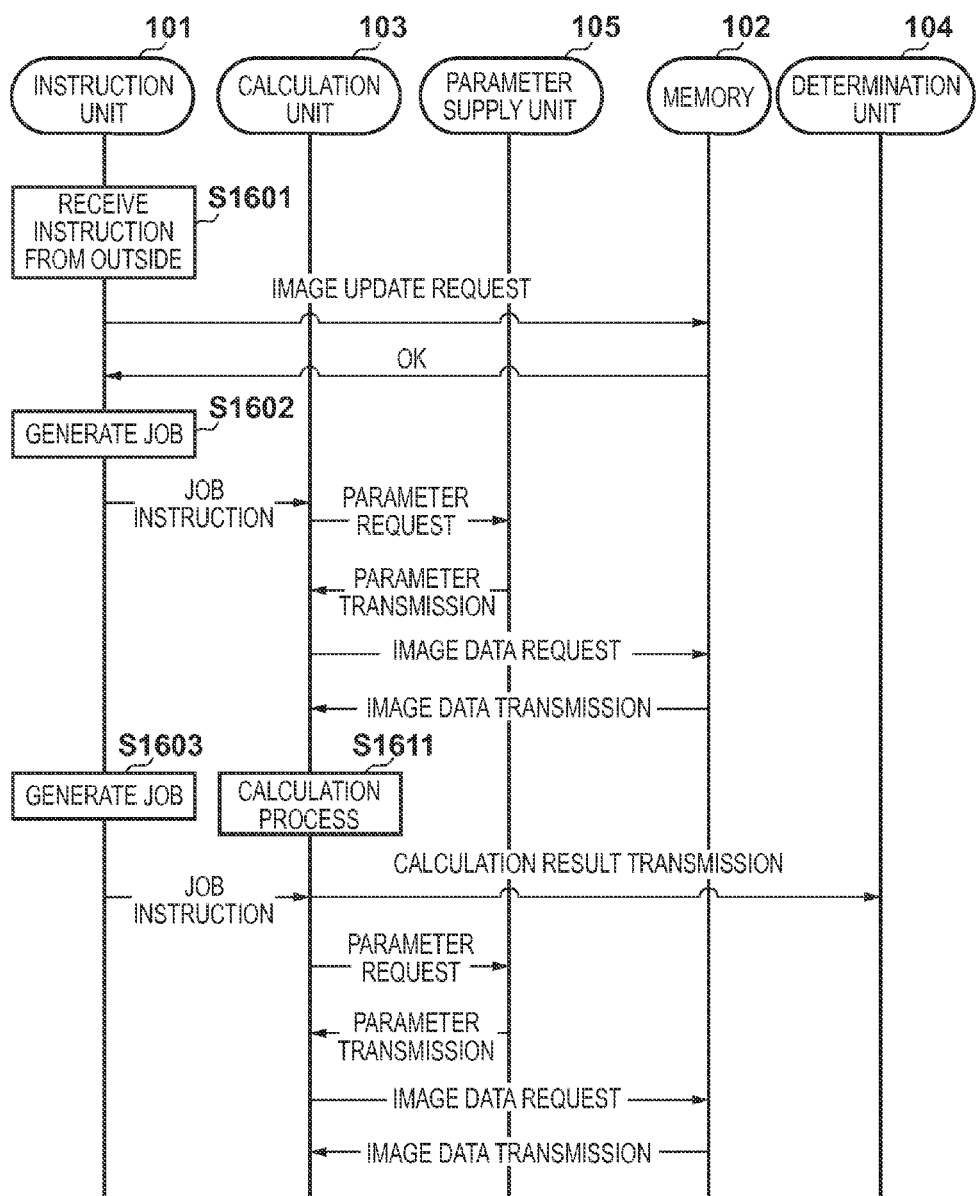
FIGS. 16A and 16B are charts showing an operation sequence between the instruction unit, a calculation unit, a parameter supply unit, a memory, and the determination unit.
Figure 16B:
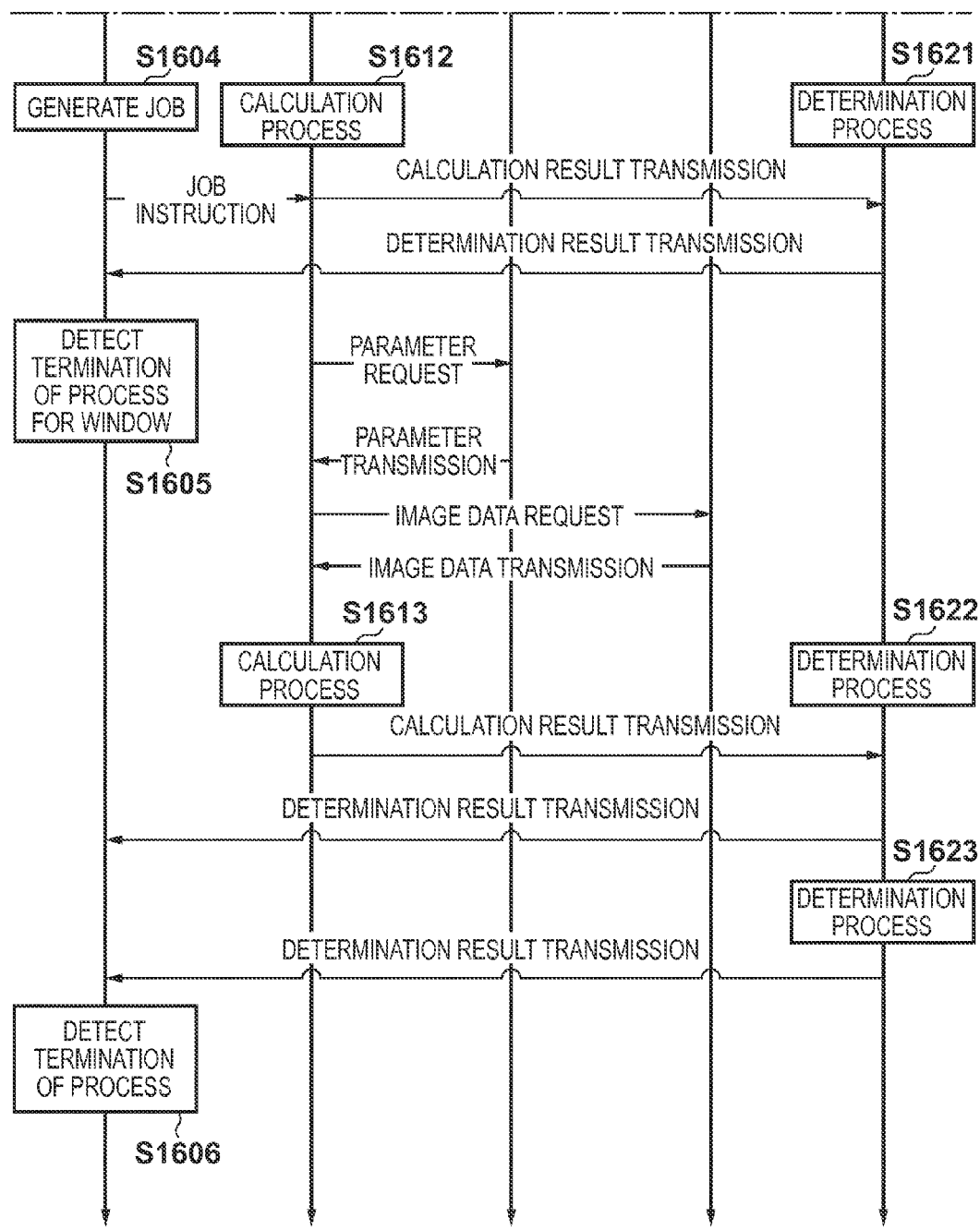

FIGS. 16A and 16B are sequence charts for explaining the sequence of processes by the instruction unit 101, calculation unit 103, parameter supply unit 105, memory 102, and determination unit 104 shown in FIG. 1. In a target object detection process, as described with reference to FIG. 2, N weak classifiers are sequentially applied to one window image, and if the window image passes through all the N weak classifiers (PASS is determined), it is determined that the window image contains a target object. If one weak classifier determines NG, processes by subsequent weak classifiers are aborted, and it is determined that the window region does not contain the target object. The N respective weak classifiers use different parameters for processes, but the process contents are the same. The memory simultaneously holds a plurality of window images.

Upon receiving an image process start instruction from the outside (step S1601), the instruction unit 101 transmits an image update request to the memory 102. Upon receiving the image update request from the instruction unit 101, the memory 102 requests image data of the outside, and accumulates image data which have been transmitted from the outside in response to the image data request. When data are accumulated in an amount large enough to form a plurality of window images, the memory 102 sends back a response (OK) to the instruction unit 101.

The instruction unit 101 instructs the calculation unit 103 to execute the classification process (job instruction). The instruction unit 101 adds pieces of identification information (ID) to a window image to undergo the classification process and a weak classifier for the calculation unit 103. A process by one weak classifier for one window image will be called a classification job or simply a job. The classification job is designated by transmitting a pair of window image identification information (ID) and weak classifier identification information (ID) to the calculation unit 103. In each of steps S1602, S1603, and S1604, the instruction unit 101 determines a classification job to be processed next, and transmits a classification job instruction to the calculation unit 103. Generation of a classification job in steps S1602 to S1604 will be described later.

The calculation unit 103 receives the instruction from the instruction unit 101 and transmits a parameter request to the parameter supply unit 105. Parameters include a coefficient to be used in subsequent calculation process step S1611, a threshold for determining whether to continue (PASS) or abort (termination: NG) the classification process, and information about the position and size of a reference region in the window image. Upon receiving the parameters transmitted from the parameter supply unit 105, the calculation unit 103 transmits an image data request to the memory 102 in accordance with the parameters to refer to image data necessary for the calculation process. The calculation unit 103 receives image data transmitted from the memory 102, and performs predetermined calculation using the received image data and the previously received parameters (step S1611). The calculation unit 103 then transmits the calculation result (PASS/NG) to the determination unit 104.

Steps S1612 and S1613 are calculation processes for classification jobs different from that in step S1611.

Classification jobs in steps S1612 and S1613 are different in at least one of the window image identification information (ID) and weak classifier identification information (ID). A parameter request and image data request are issued in accordance with each classification job. However, the process contents are the same as those in step S1611.

The determination unit 104 receives the calculation result in step S1611 from the calculation unit 103, performs a determination process (step S1621), and transmits the result to the instruction unit 101. The determination process will be described later. Note that steps S1622 and S1623 are the same process except that classification jobs to be determined are different. Upon completion of the determination process, the determination unit 104 transmits the classification result to the instruction unit 101, similar to step S1621.

Designation of a classification job by the instruction unit 101, transmission of a calculation result from the calculation unit 103, and transmission of a determination result from the determination unit 104 are executed at different timings. However, this is merely descriptive convenience, and these processes may be executed at almost the same timing in practice. For example, designation of a classification job for the job generation result in step S1604, and transmission of a determination result serving as the result of the determination process in step S1621 can be executed almost simultaneously.

FIG. 16B exemplifies a case in which the determination result is finalized in the determination process of step S1621. The instruction unit 101 receives the determination result in step S1621 from the determination unit 104. If the determination result includes a result representing that the window image contains a target object (specific pattern), the instruction unit 101 detects that the detection process for the window image has terminated (step S1605). After that, the instruction unit 101 stops generation of a classification job.

However, all processes by the respective units shown in FIG. 1 terminate in step S1606 after receiving a determination result transmitted from the transmission process of step S1623. To determine in step S1606 whether all processes have terminated, the number of jobs designated to the calculation unit 103 by job generation by the instruction unit 101, and the number of determination results transmitted from the determination unit 104 to the instruction unit 101 are counted respectively. After termination of the process for the window image is detected in step S1605, the instruction unit 101 determines that the whole process has terminated at the timing when the two counts coincide with each other.

If the determination processes in steps S1622 and S1623 are classification jobs for the same window image as the window image for which the classification result has been finalized in step S1621, the determination unit 104 determines that the classification process for the window image has terminated. By comparing pieces of identification information (ID), the determination unit 104 can determine whether window images are identical. The instruction unit 101 also detects in step S1605 that the detection process for the window image has terminated, and has already learned that the classification process for the window image has terminated. In this case, to reduce the burden of overlapping calculation processes, it is also possible to skip the determination processes in steps S1622 and S1623 and send back dummy data to the instruction unit 101.

In this case, for example, the results of the calculation processes in step S1612 and S1613 need not be accurate. Hence, after the determination results of all window images are finalized in the determination process of step S1621, the instruction unit 101 may instruct the memory 102 to replace image data. The memory 102 can send back a response to an image data request from the calculation unit 103 to the memory 102 even during image data replacement. While the calculation unit 103 can advance calculation, the calculation burden of overlapping determination processes in the determination unit 104 can be reduced.

(Process by Instruction Unit 101)

Figure 5:
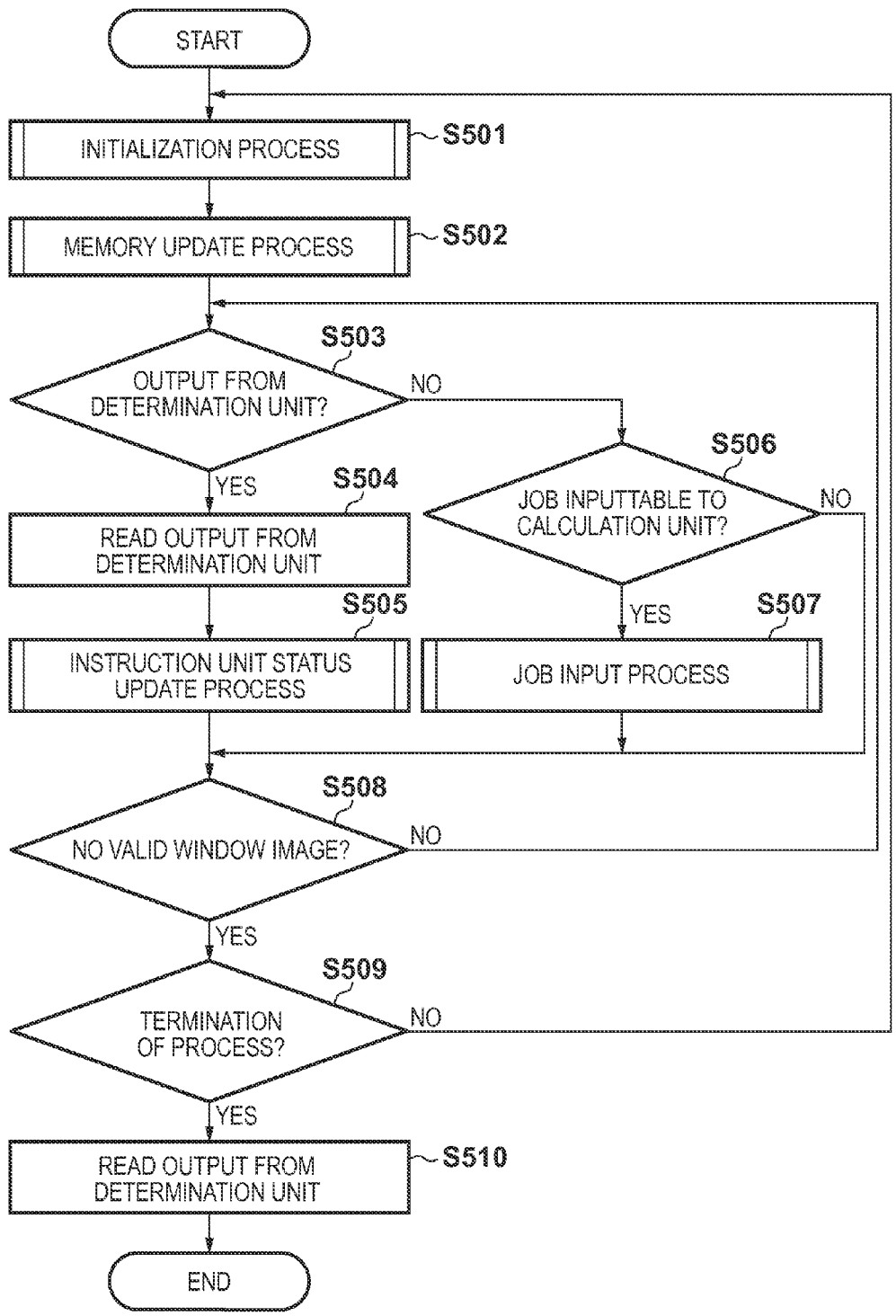
FIG. 5 is a flowchart for explaining the sequence of a process by an instruction unit.

FIG. 5 is a flowchart showing the sequence of a process by the instruction unit 101. The memory 102 holds W (W>0) window images, and pieces of identification information 0 to (W−1) are assigned to the respective window images to discriminate them. In the example of FIG. 11, pieces of window image identification information (ID)=0 to 4 are assigned in order to the window images 1101 to 1105.

Further, pieces of weak classifier identification information (ID)=0 to (N−1) are assigned in order from a weak classifier arranged at the start, and the classification process is executed sequentially in the order of weak classifier identification information (ID). In step S501, the instruction unit 101 performs an initialization process. Details of the initialization process will be explained with reference to FIG. 6.

In step S601, current which holds identification information (ID) of a window image to be processed next is initialized to W−1. current is set to W−1 in order to start the process from the 0th window image identification information (ID) in a classification job input process (to be described later). However, it suffices to definitely initialize the value, and current may be initialized by another window image identification information (ID). In addition, 1 is set in init_flag to represent the first process.

In step S602, a counter i for counting the number of processes in steps S603 and S604 is initialized to 0. In step S603, it is determined whether to end the loop process. For this purpose, it is determined whether the process in step S604 has been performed N times. If the process has not been performed N times (YES in step S603), the process in step S604 is repeated. If the process has been performed N times (NO in step S603), the process ends.

In step S604, the value of an array win_status[i] is initialized to 0, and the value of the counter i is counted up. Then, the process returns to step S603.

The embodiment adopts win_status as a variable for managing the status of each window image. win_status has W arrays, and holds the value of a weak classifier ID to be processed next. If the value is negative, this means that the classification process for the window has terminated. In the initialization process, 0 is set as weak classifier identification information (ID) to be processed next.

Figure 6:
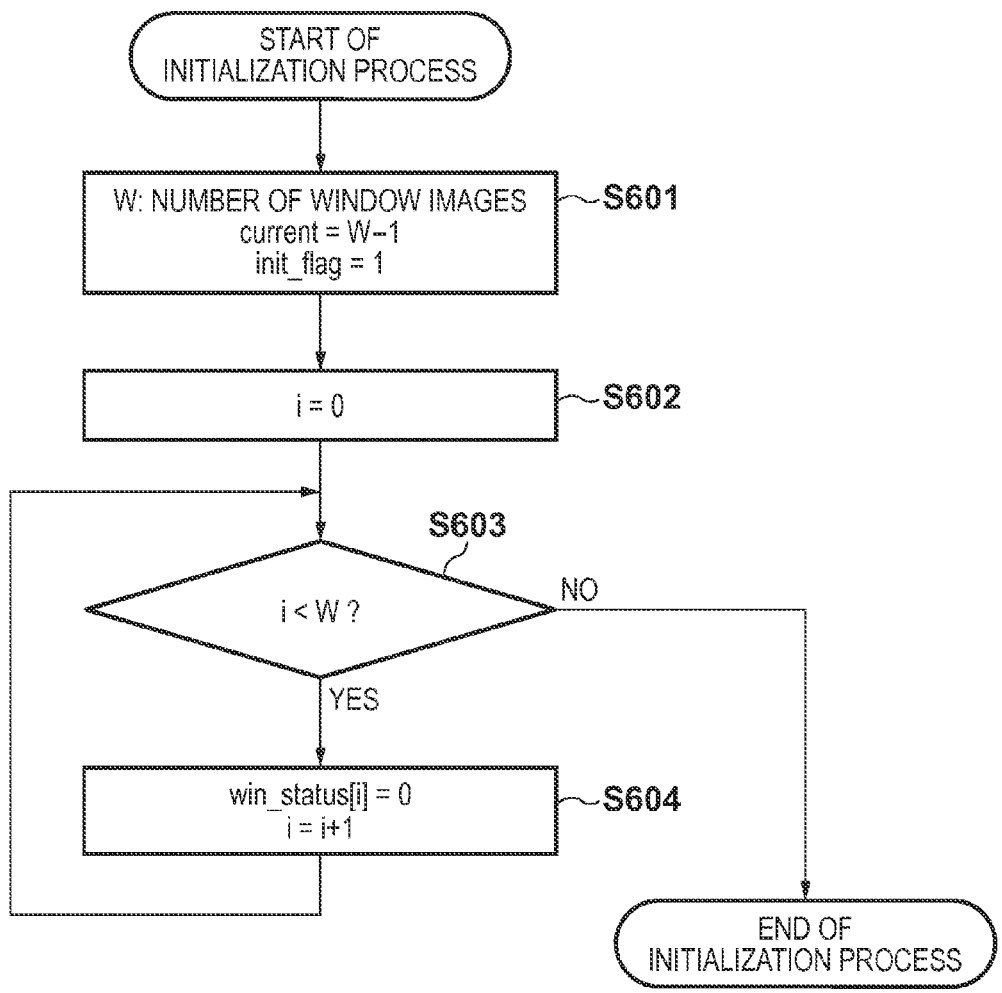
FIG. 6 is a flowchart for explaining the sequence of an initialization process in the process by the instruction unit.
Figure 9:
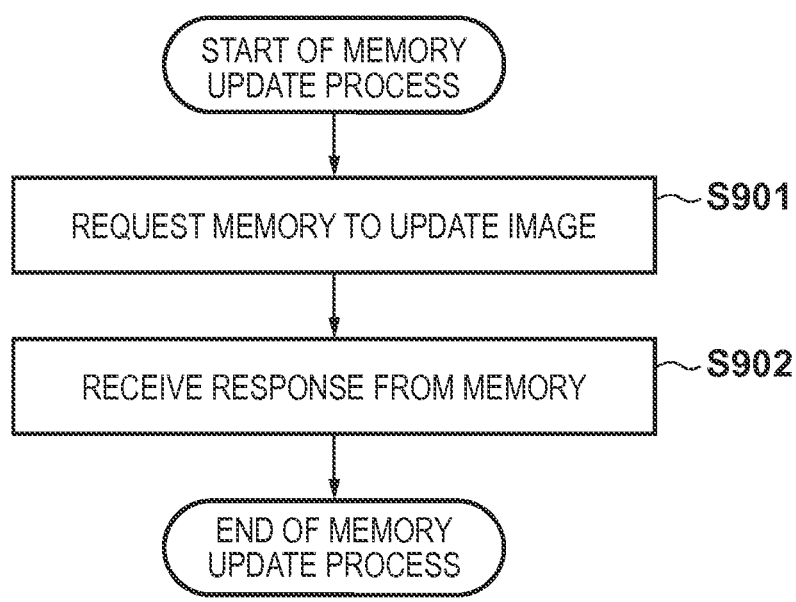
FIG. 9 is a flowchart for explaining the sequence of a memory status update process in the process by the instruction unit.

After the end of the initialization process (step S501, FIG. 6) described with reference to FIG. 6, the process advances to step S502 of FIG. 5. In step S502, the instruction unit 101 performs a memory update process for the memory 102. Details of the memory update process will be explained with reference to FIG. 9. In step S901, the instruction unit 101 transmits an image update request to the memory 102. Upon receiving the image update request from the instruction unit 101, the memory 102 requests image data of the outside, and accumulates image data transmitted from the outside in response to the image data request. In step S902, after accumulating a data amount large enough to form a plurality of window images, the memory 102 sends back a response (OK) to the instruction unit 101.

Figure 7:
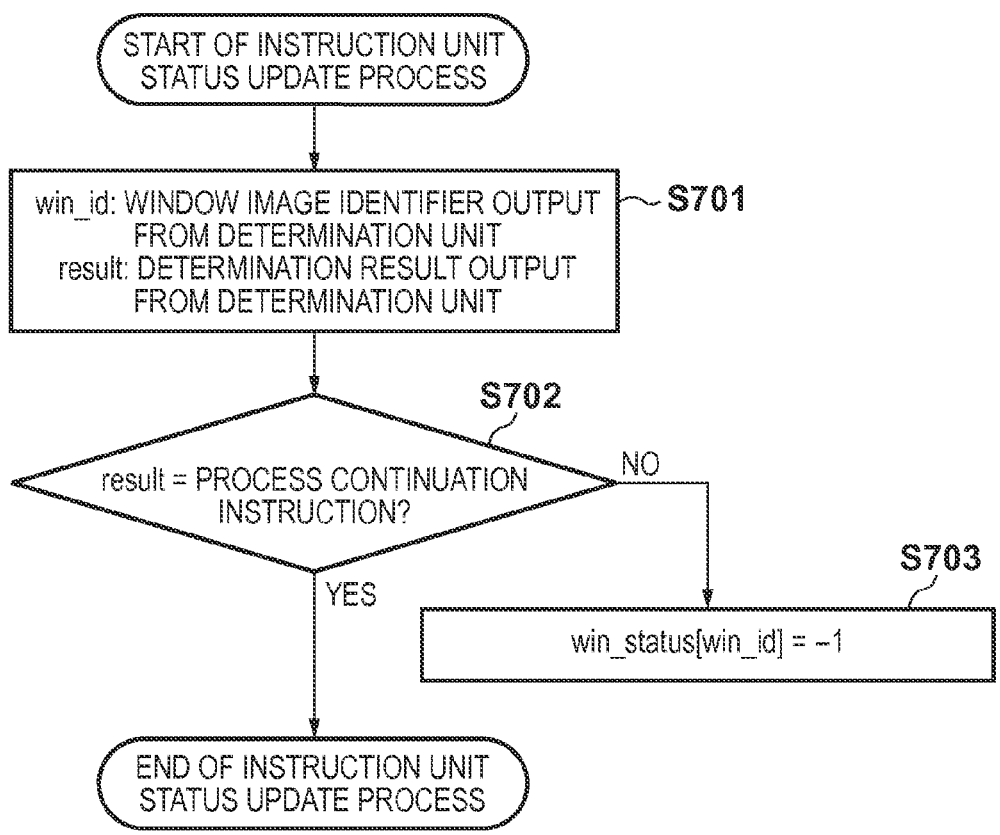
FIG. 7 is a flowchart for explaining the sequence of an instruction unit status update process in the process by the instruction unit.

After the end of the memory update process (step S502, FIG. 9), the process advances to step S503 of FIG. 5. In step S503, the instruction unit 101 confirms the presence/absence of an output from the determination unit 104. If there is an output from the determination unit 104 (YES in step S503), the process advances to step S504. In step S504, the instruction unit 101 reads the output (determination result) from the determination unit 104. In step S505, the status of the instruction unit 101 is updated in accordance with the output (determination result) from the determination unit 104. Details of the instruction unit status update process will be explained with reference to FIG. 7.

Figure 3:
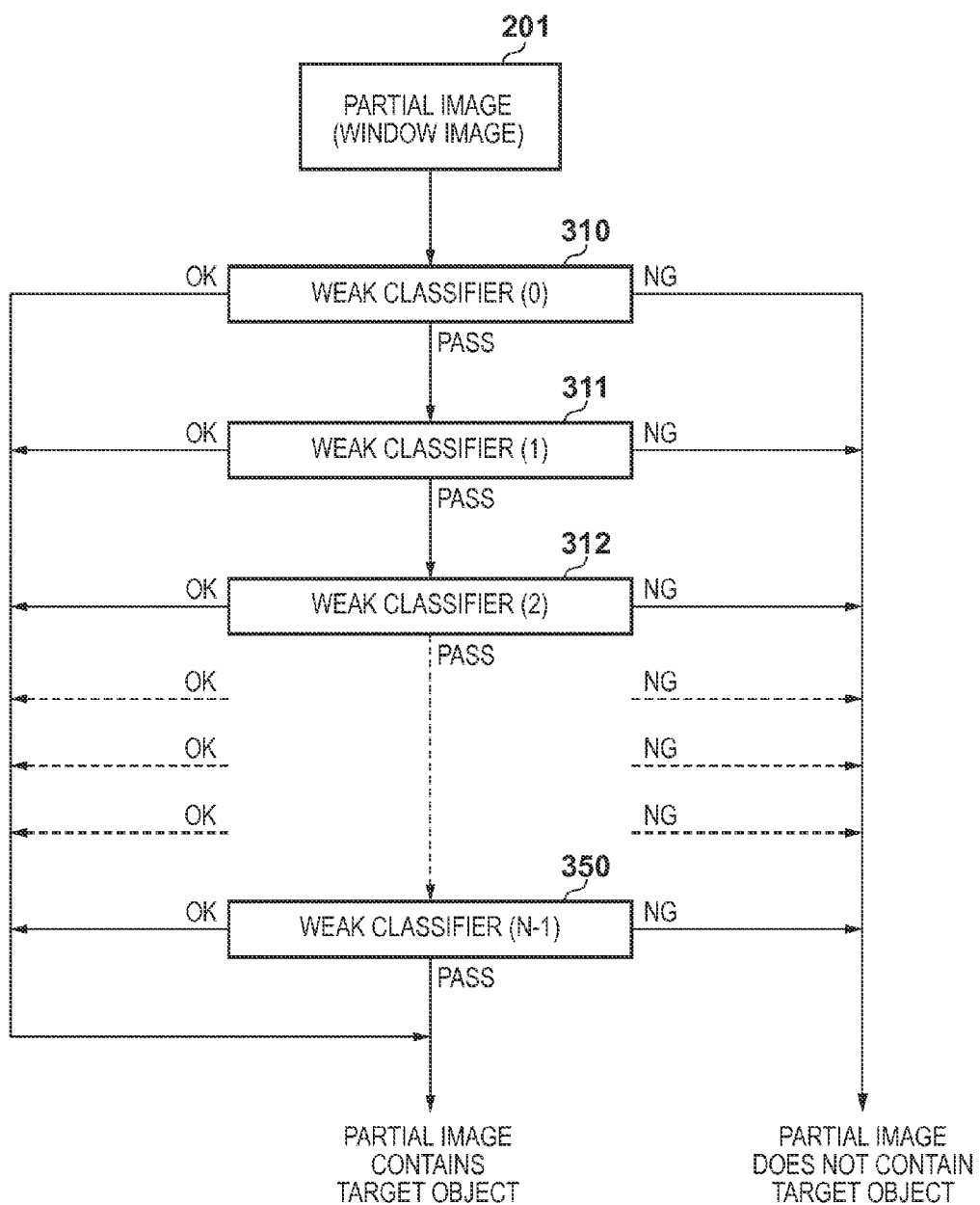
FIG. 3 is a view for explaining an example of a detection process using the Boosting algorithm.

Assume that the output (determination result) from the determination unit 104 includes identification information (ID) of a determined window image and the determination result. In step S701, the instruction unit 101 reads the window image identification information (ID) and determination result from the output (determination result). The determination result suffices to represent at least whether to continue (PASS) or terminate the process. For example, as determination results to be sent back from the determination unit 104, "0" represents continuation of the process, and "1" represents termination of the process. In FIG. 2, the process terminates when, for example, the job determination result is NG or the window image has passed (PASS) through the final weak classifier 250. In FIG. 3, the process terminates even when an intermediate weak classifier determines OK. A job result for a window image having undergone the determination process as in step S1622 or S1623 of FIG. 16B also corresponds to termination of the process.

As for these determination results, more detailed meanings may be assigned to signals. However, it suffices to determine at least whether to keep processing the window image or terminate the process.

In step S702, the instruction unit 101 determines whether to instruct to continue the process for a window image indicated by the window image identifier (win_ID) output from the determination unit 104. If the determination result (result) =0, the instruction unit 101 determines to continue the process (YES in step S702), and the process ends. If the instruction unit 101 determines the determination result (result)=1 in step S702, it determines to terminate the process (NO in step S702), and the process advances to step S703.

Step S703 is a process of invalidating a window image. As described above, −1 is set as the value of the determination result to invalidate win_status [win_ID] and terminate the process.

Figure 8:
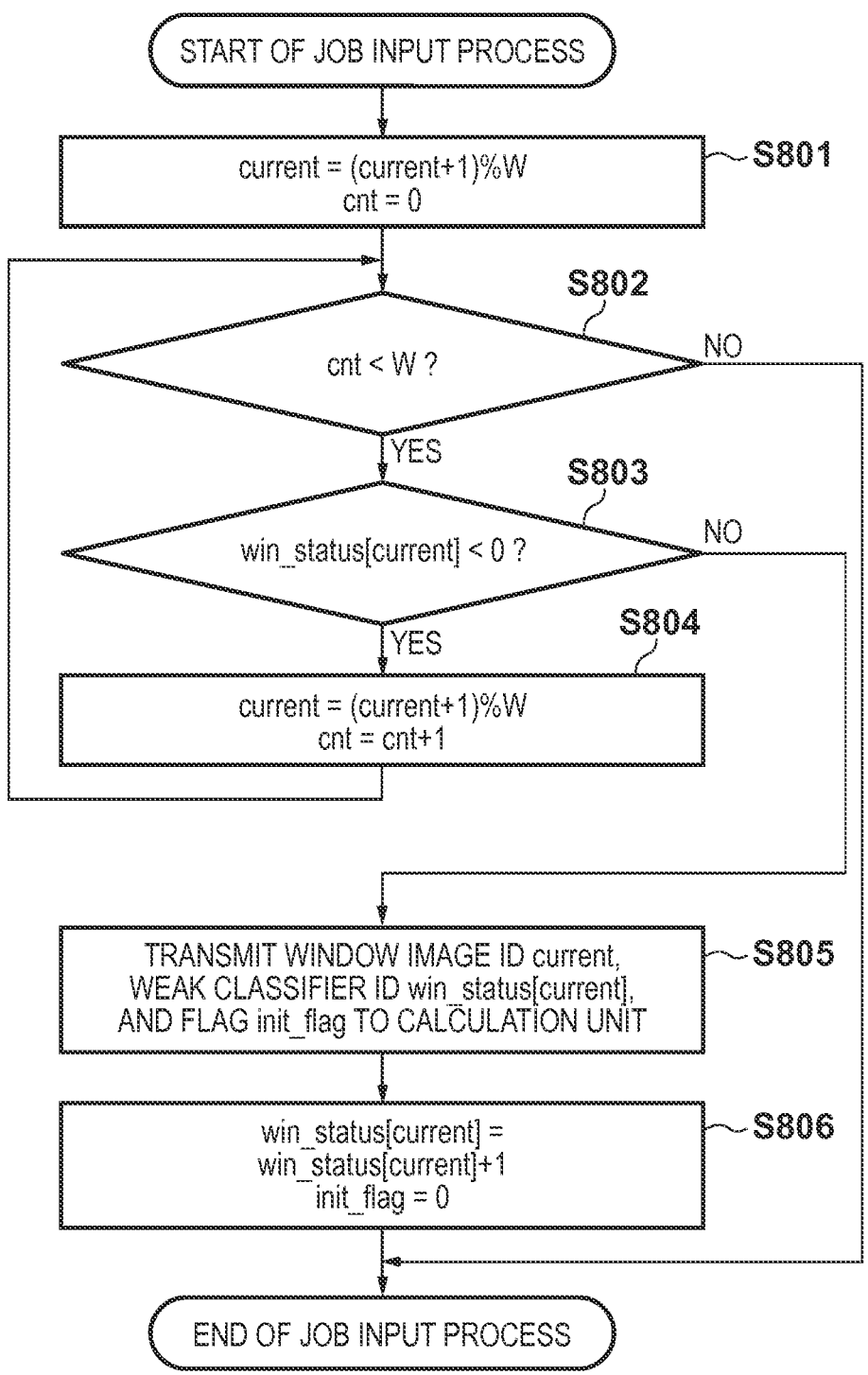
FIG. 8 is a flowchart for explaining the sequence of a job input process in the process by the instruction unit.

Referring back to step S503 of FIG. 5, if the instruction unit 101 determines in step S503 that there is no output from the determination unit 104 (NO in step S503), the process advances to step S506. In step S506, the instruction unit 101 determines whether the calculation unit 103 has a free area for inputting a classification job. If the calculation unit 103 does not have a free area (NO in step S506), the process advances to step S508. If the calculation unit 103 has a free area for inputting a classification job, the process advances to a job input process in step S507. Details of the job input process will be explained with reference to FIG. 8.

In step S801, the instruction unit 101 updates the current value. Also, the instruction unit 101 initializes, to 0, a counter cnt for controlling processes in steps S802 to S804. In step S802, the instruction unit 101 determines whether to escape from the loop process. If cnt≥W (NO in step S802), the process ends. The instruction unit 101 determines NO in step S802 when there is no window image to be input next as a classification job.

If the instruction unit 101 determines in step S802 that cnt<W (YES in step S802), the process advances to step S803. In step S803, the instruction unit 101 determines whether the window image indicated by current is valid. If the status is win_status[current]<0, the instruction unit 101 determines that the process for the window image indicated by current has terminated, that is, the window image is invalid (YES in step S803). If the window is invalid (YES in step S803), the process advances to step S804. In step S804, the instruction unit 101 updates the current value and cnt value, and the process returns to step S802 to repeat the same processes. If the instruction unit 101 determines in step S803 that a valid window has been detected (NO in step S803), the process advances to step S805.

In step S805, the instruction unit 101 transmits, to the calculation unit 103, a classification job having the window image ID "current" and the weak classifier ID "win_status[current]". The instruction unit 101 transmits the flag init_flag together with the classification job. If a classification job is transmitted for the window image for the first time in this process, init_flag=1 has been set in the initialization process (step S601 in FIG. 6), and thus init_flag=1 is transmitted.

In step S806, the instruction unit 101 increments win_status[current] by "1" to update win_status[current], and sets "0" in init_flag. By this process, the job input process ends. After the end of the instruction unit status update process (step S505, FIG. 7) or the job input process (step S507, FIG. 8), the process advances to step S508 of FIG. 5. In step S508, the instruction unit 101 determines whether there is a valid window image. If all the elements of win_status have negative values, the instruction unit 101 determines that there is no valid window image (YES in step S508). If the instruction unit 101 determines in step S508 that there is a valid window image (NO in step S508), the process advances to step S503 to repeat the same processes.

If the instruction unit 101 determines in the determination process of step S508 that there is no valid window image (YES in step S508), the process advances to step S509 to determine whether to terminate the process. For example, information indicating the number of window image replacements to perform the determination process and then terminate the process is received in an external control input, and the number of processes executed in steps S501 to S509 of FIG. 5 is counted. Based on this comparison, YES/NO in step S509 may be decided. Alternatively, in the determination of step S509, an instruction whether to continue or terminate the process can be received from the outside to make the termination determination based on the instruction. If the instruction unit 101 determines in step S509 not to terminate the process (NO in step S509), the process returns to step S501 to repeat the same processes.

Step S510 is a process corresponding to steps S1622 and S1623 in FIG. 16B, and is a process of waiting for a response from the determination unit 104.

(Process by Determination Unit 104)

Figure 10:
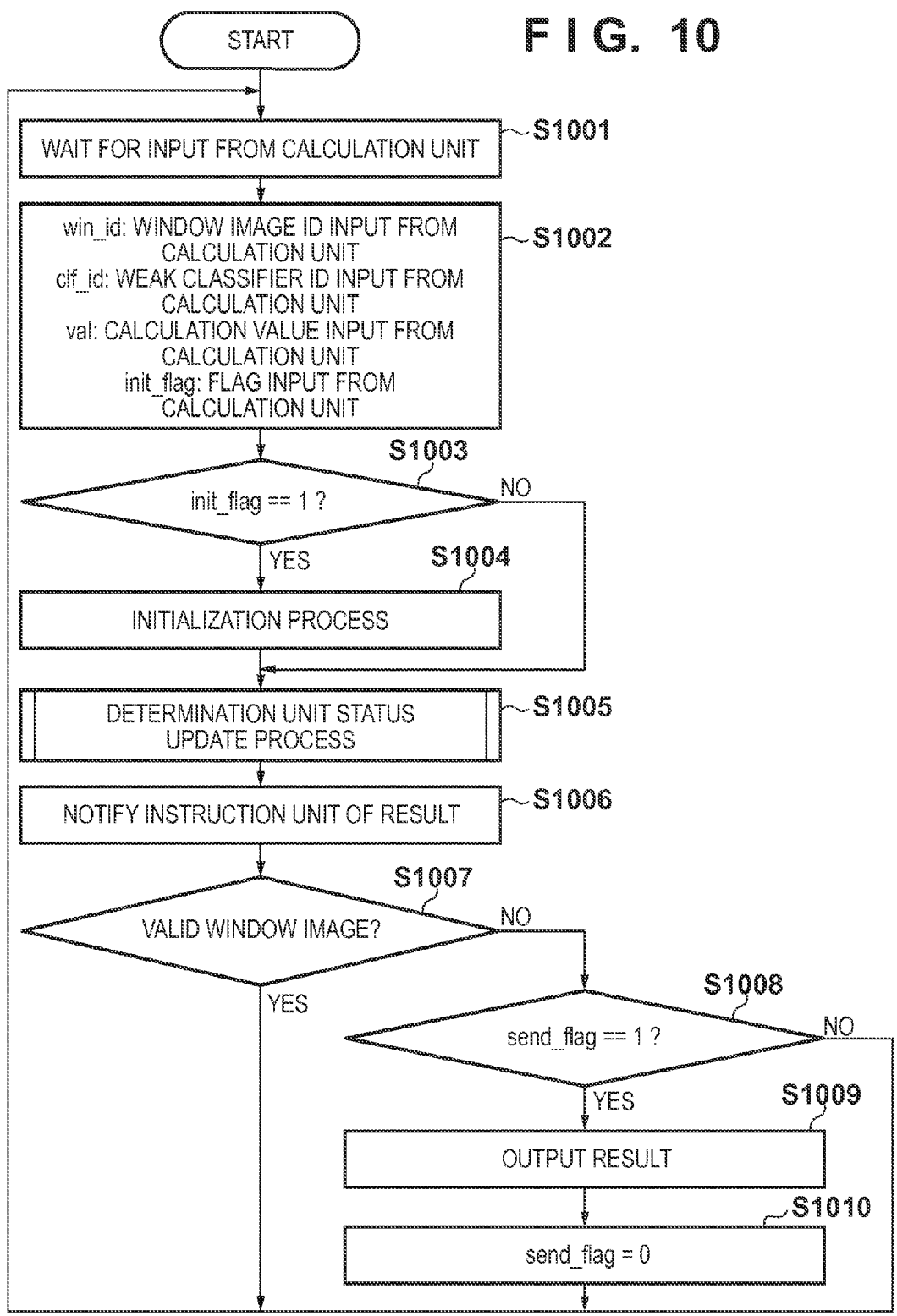
FIG. 10 is a flowchart for explaining the sequence of a process by a determination unit.

A process by the determination unit 104 will be described with reference to FIG. 10. In step S1001, the determination unit 104 waits for an input from the calculation unit 103. In step S1002, the determination unit 104 receives a window image ID "win_ID", weak classifier ID "clf_I", calculation value "val", and initialization flag "init_flag" from the calculation unit 103. The window image ID, weak classifier ID, and init_flag are the same as those transmitted from the instruction unit 101 to the calculation unit 103 in step S805 of FIG. 8.

In step S1003, the process branches based on the init_flag value. If init_flag is 1 (YES in step S1003), the determination unit 104 performs an initialization process in step S1004. If NO in step S1003, the process skips step S1004 and advances to step S1005.

In the initialization process of step S1004, the determination unit 104 initializes a variable for managing whether each window image has been determined. For example, information win_status2[win_ID] (array: W elements) representing a determination status is set. An element value of 0 represents that the process of the window image has been determined (status has been finalized); otherwise, determination of the process for the window image has not terminated. In this case, a non-zero value (window is valid), for example, 1 is set for each element. Also, the value of a flag send flag (used to determine whether the result has been transmitted) used in step S1008 is initialized to 0. Further, an information win_detect[ ] array (W elements) representing the detection result of each window image is arranged, and 0 is set in each element. The win_detect[ ] array stores the detection result of each window. 0 represents that no window has been detected, and 1 represents that a window has been detected.

Figure 17:
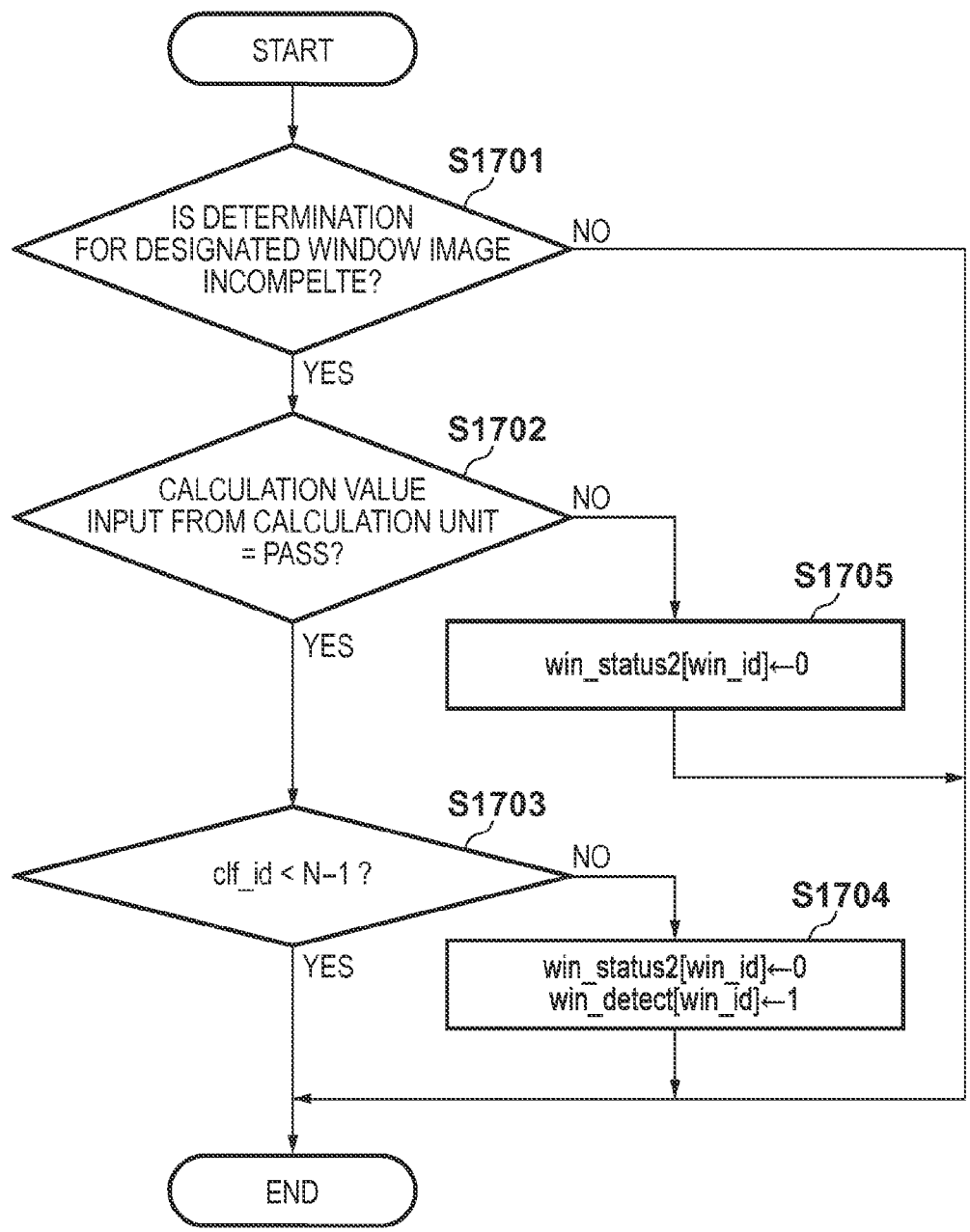
FIG. 17 is a flowchart for explaining the sequence of a determination unit status update process in the process by the determination unit.

In step S1005, the internal status of the determination unit 104 is updated. At this time, the win_status2[win_ID] value is updated based on a result output from the calculation unit 103. In the example of FIG. 2, if the calculation result of the calculation unit 103 is NG or the window image has passed (PASS) through the final weak classifier (N−1), that is, weak classifier 250 in FIG. 2, and the status is finalized, the win_status2[win_ID] value is updated to 0. Details of step S1005 will be explained with reference to FIG. 17.

In step S1701, the determination unit 104 determines whether determination of a designated window image is incomplete. This determination is made based on win_ID received from the calculation unit 103 by referring to an element of the win_status2[ ] array that corresponds to win_ID, that is, win_status2[win_ID], and comparing this value with 0. If win_status2[win_ID] is non-zero, determination of the window image is incomplete (YES in step S1701), and the process advances to step S1702. If win_status2[win_ID]=0 (NO in step S1701), the process in FIG. 17 ends.

In step S1702, the determination unit 104 determines whether a calculation value input from the calculation unit 103 represents PASS. The calculation value is determined using a threshold corresponding to a weak classifier. If the calculation value is smaller than the threshold, it is NG; if the calculation value is equal to or larger than the threshold, it is PASS. If the threshold changes depending on the weak classifier, the parameter supply unit 105 supplies the threshold. In FIG. 1, the parameter supply unit 105 is not directly connected to the determination unit 104. However, the determination unit 104 can receive the threshold via, for example, the calculation unit 103. Although not shown in FIG. 1, the determination unit 104 may be connected to the parameter supply unit 105 and receive the threshold via the connection. The correspondence between the magnitude relation with the threshold and NG/PASS is merely an example. In this calculation, it is also possible to determine PASS if the value is smaller than the threshold, and NG if it is equal to or larger than the threshold.

If YES in step S1702, the process advances to step S1703; if NO, to step S1705. In step S1703, the determination unit 104 determines whether a weak classifier during the process is the final weak classifier, that is, weak classifier 250 in FIG.

2. For this purpose, the weak classifier during the process is compared with N−1 based on clf_ID received as the weak classifier ID from the calculation unit 103. If YES in step S1703, the weak classifier to be determined is not the final classifier, and the process ends. If NO in step S1703, the weak classifier during the process is the final weak classifier. Hence, if the determination result is PASS, it is determined that a face serving as a detection target has been "detected", and the detection target is processed. In step S1704, the window image passes (PASS) through the final weak classifier, and the determination status is finalized. The value of the information win_status2[win_ID] representing a determination status is set to 0. To store "detected", the value of the information win_detect[win_ID] representing a detection result is set to 1, and the process ends. As the detection result of each window image, for example, 0 represents that no detection target has been detected, and 1 represents that a detection target has been detected.

If the determination unit 104 determines in step S1702 that the determination result of the weak classifier is NG, it determines in step S1705 that the partial image does not contain the target object (specific pattern). Thus, the value of the information win_status2[win_ID] representing a determination status is set to 0, and the process ends. After the end of the process (FIG. 17) in step S1005, the process advances to step S1006 of FIG. 10, and the determination unit 104 notifies the instruction unit 101 of the result of the determination unit status update process.

In step S1007, the determination unit 104 refers to the win_status2[ ] array to determine whether there is a valid window image. If there is no valid window image (NO in step S1007), the process advances to step S1008. If YES in step S1007, the process returns to step S1001. In step S1008, the determination unit 104 checks the value of the flag send flag used to determine whether the result has been transmitted, and the process branches. If the value of the flag send flag is 1 (YES in step S1008), the process advances to step S1009. If NO in step S1008, the process returns to step S1001 (NO in step S1008).

In step S1009, the determination unit 104 executes a determination result output process. In this case, region detection/non-detection of each window image is output based on the value of each element of the win_detect[ ] array. The output format is arbitrary.

In step S1010, the send flag value is set to 0. This is because the determination unit 104 may receive a job calculation result from the calculation unit 103 even after the end of detecting all window images, as described with reference to FIGS. 16A and 16B. The pass to step S1008 in the flowchart of FIG. 10 may be circulated a plurality of times. Hence, the process in step S1010 aims at executing the process in step S1009 only once in the first time. After executing step S1010, the determination result in step S1008 becomes false (NO in step S1008), and step S1009 is not executed. If 1 is given to init_flag, init_flag is set to 1 in the initialization process of step S1004, and the determination result in step S1008 becomes true again.

A process by the calculation unit 103 is arbitrary if it is a weak classification process in a known detection process. An outline is as follows. First, the calculation unit 103 specifies a window image based on a window image ID designated for a classification job by the instruction unit 101 among a plurality of window images set in the memory 102.

After that, the calculation unit 103 refers to some or all pixel values in the window image. The calculation unit 103 receives supply of corresponding parameters from the parameter supply unit 105 based on the weak classifier ID of the classification job. The calculation unit 103 executes calculation using the pixel values and parameters. Thereafter, the calculation unit 103 outputs the calculation value to the determination unit 104 together with the classification job information.

The memory 102 acquires image data from the outside and holds it in accordance with an instruction from the instruction unit 101. The memory 102 can hold, for example, a plurality of window images as shown in FIG. 11. A plurality of window images suffice to simultaneously exist in the memory 102, and no window need always overlap another window, unlike FIG. 11.

Figure 4:
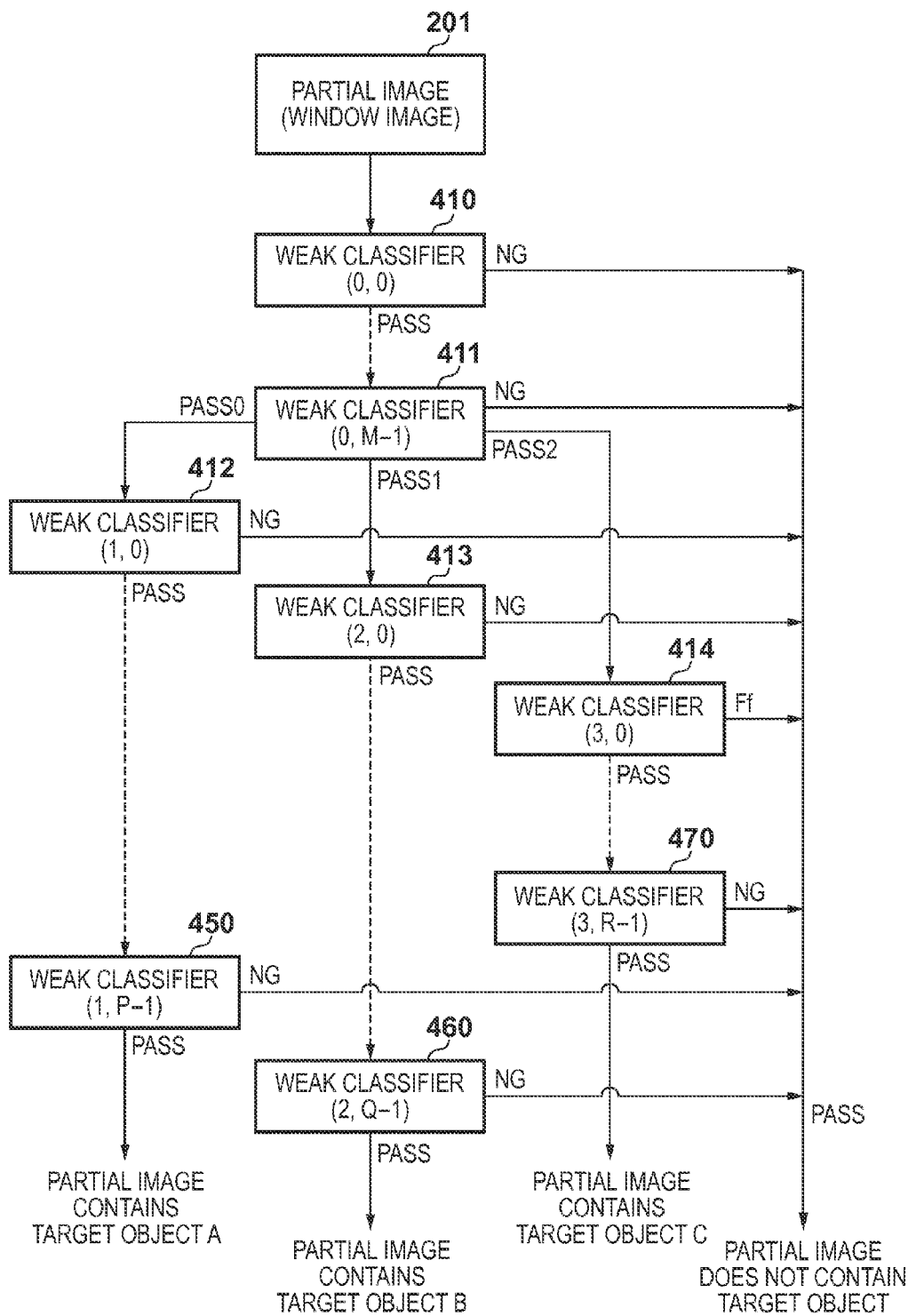
FIG. 4 is a view for explaining an example of a detection process having a branch structure using the Boosting algorithm.

The parameter supply unit 105 provides a classification process parameter in response to a request from the calculation unit 103. The parameter supply unit 105 may hold all classification process parameters. Alternatively, a large-capacity memory may be arranged outside and the parameter supply unit 105 may operate as a cache for the large-capacity memory. When the parameter supply unit 105 operates as a cache, it preferably receives an output directly from the instruction unit 101. Further, the instruction unit 101 can predict the progress of the process and prefetch in advance a classification process parameter necessary for the parameter supply unit 105. When the instruction unit 101 predicts the progress of the process, it instructs the parameter supply unit 105 to prefetch a classification parameter used in a weak classifier preceding by N (N≥0) weak classifiers a weak classifier which issues an instruction to the calculation unit 103 in, for example, the processes of FIGS. 2 to 4. N may be determined in advance or dynamically by predicting the progress of the weak classifier process by any method.

(Process by Weak Classifier)

A process by the weak classifier will be described with reference to FIGS. 12 to 15. The processing method of the weak classifier is applicable to a classification process for weak classifiers connected in line as shown in FIG. 2 or 3. However, the processing method is not limited to this example, and is also applicable to a classification process having a branch structure shown in FIG. 4. The processing method is applicable to a classification process by weak classifiers connected in line (for example, weak classifiers (1,0), . . . , (1,P−1), weak classifiers (2,0), . . . , (2,Q−1), or weak classifiers (3,0), . . . , (3,R−1)). It is obvious that the processing method is also applicable to multiple branches if a process by a weak classifier at a branch destination is virtually handled as a process for another detection window image.

Figure 12:
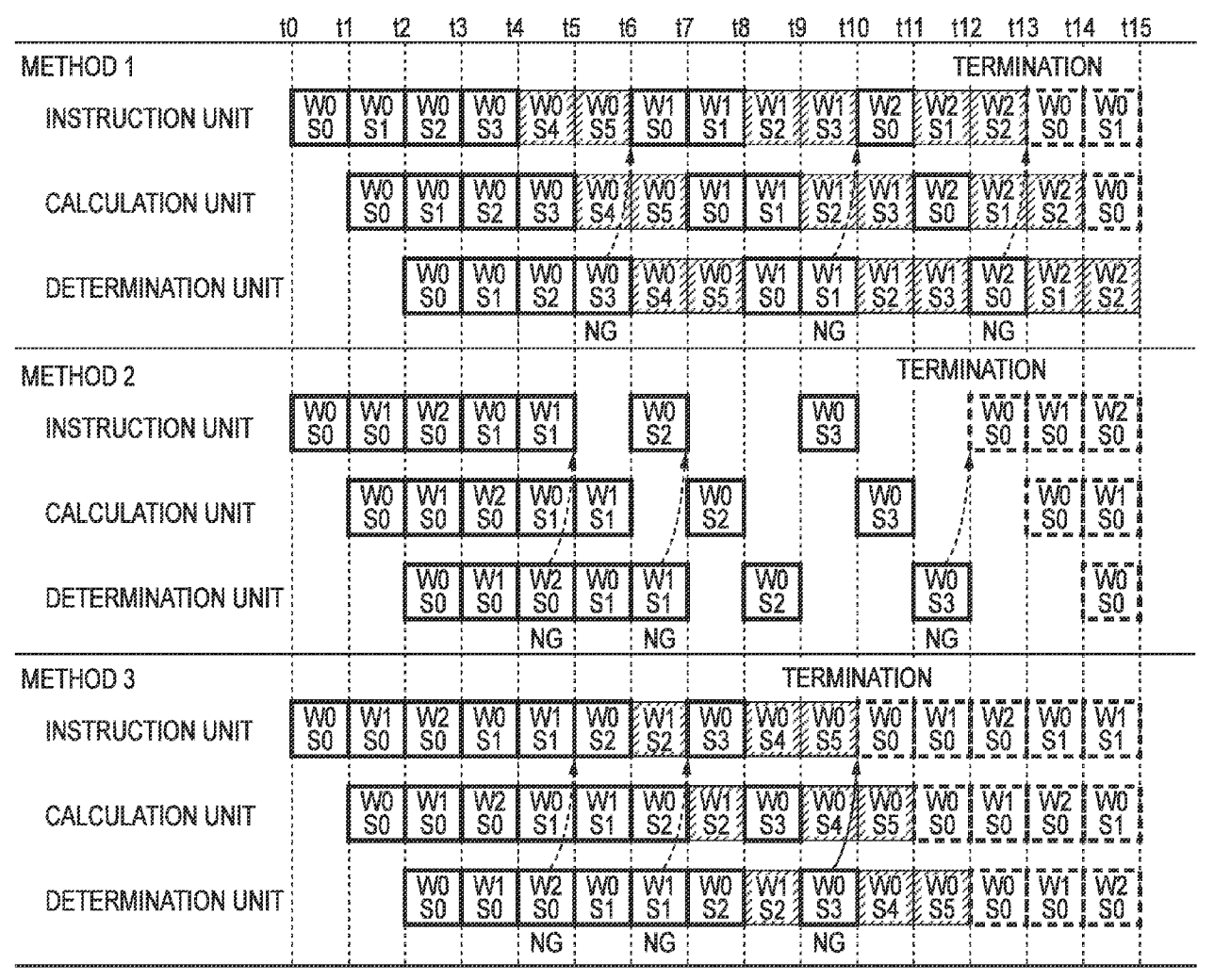

For descriptive convenience, finalizing that a window image to be detected contains or does not contain a target object (specific pattern) will also be referred to as terminating a process for the window image to be detected. FIGS. 12 to 15 are timing charts when the instruction unit 101, calculation unit 103, and determination unit 104 process a classification job. In FIGS. 12 to 15, the abscissa is the time axis. In FIG. 12, 15 time slots exist between time t0 and t15. In FIGS. 13 to 15, 20 time slots exist between time t0 and time t20. Each unit processes one classification job in each time slot. A square in a time slot represents a classification job, Wx represents that the window image ID is x, and Sy represents that the weak classifier ID is y. For descriptive convenience, assume that a group of window images includes a maximum of three window images having an ID of 0 to 2 ($0 \leq x \leq 3$). Also, assume that there are six weak classifiers having an ID of 0 to 5 ($0 \leq y \leq 5$). If a window image has passed (PASS) the weak classifier S5, it is detected that the window image contains a target object (specific pattern). A classification job having the window ID=Wx and the weak classifier ID=Sy will also be referred to as Wx/Sy.

Figure 13:
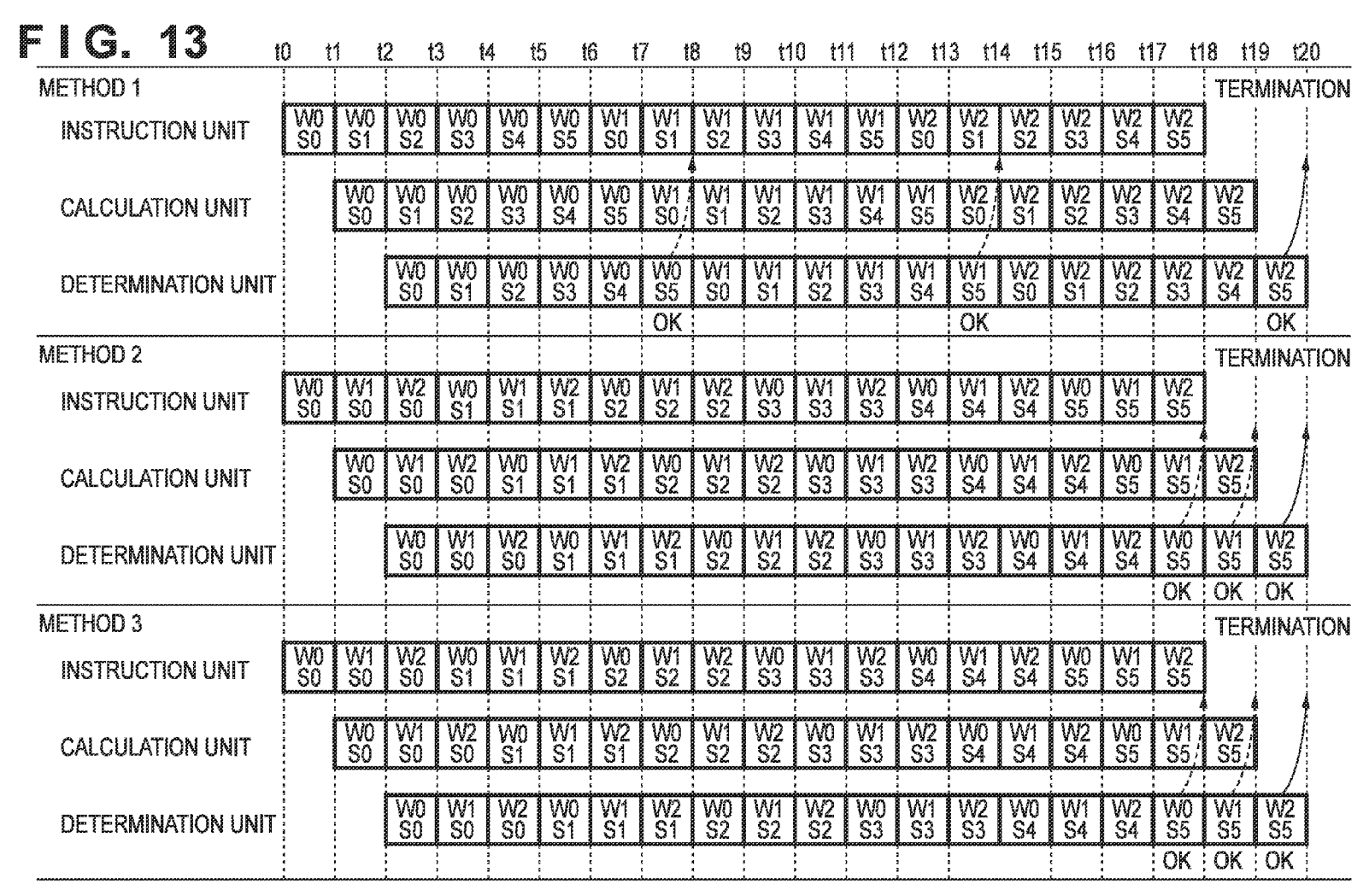

In FIGS. 12 to 15, the processes of classification jobs represented by squares of solid lines are performed for the first window image group. When it is detected that the process for all window images has terminated, the instruction unit 101 replaces image data in the memory at time t13. Then, classification jobs represented by squares of broken lines are performed for the next window image group. FIG. 13 is a timing chart regarding one window image group. FIG. 13 does not show classification jobs for the second window image group, that is, classification jobs indicated by broken lines for the window image group as shown in FIG. 12. A hatched square represents a classification job for which the process has actually terminated in a weak classifier preceding a weak classifier corresponding to the classification job. FIGS. 12 to 15 show the difference in process between three methods 1, 2, and 3. Methods 1 to 3 operate as follows.

(Method 1)

A classification job is designated speculatively until the process for a given window image to be detected terminates. When it is detected that the classification process has terminated, designation of the classification process for the window image stops, and a classification job for the next window image is designated.

(Method 2)

Classification jobs for respective window images by the same weak classifier are designated, and the classification results are waited. The classification results are received, and if the process for the window image has not terminated, a classification job for the next weak classifier is designated.

(Method 3)

An image data process according to the embodiment of the present invention adopts this method. While circulating through window images for which the classification process has not terminated upon designation of a classification job, a classification job for the next classifier is designated.

FIG. 12 shows an example in which three window images W0 to W2 exist in the first window image group and determination results as shown in Table 1 are obtained.

TABLE 1

Determination Results in FIG. 12

| Window Image ID | Final Weak Classifier ID | Determination Result |
|---|---|---|
| W0 | S3 | NG |
| W1 | S1 | NG |
| W2 | S0 | NG |

The case in Table 1 is processed according to method 1, as shown in Table 2. Table 2 lists the times and the processes of the instruction unit and determination unit for processes according to method 1. In Table 2, a hatched cell represents a classification job for which the process has terminated in a weak classifier preceding a weak classifier corresponding to the classification job. A blank cell represents a state in which no classification job is processed.

TABLE 2

Processes According to Method 1 in FIG. 12

| Time | Instruction Unit | Determination Unit |
|---|---|---|
| t0 | W0/S0 is designated | |
| t1 | W0/S1 is designated | |
| t2 | W0/S2 is designated | W0/S0: PASS |
| t3 | W0/S3 is designated | W0/S1: PASS |
| t4 | W0/S4 is designated | W0/S2: PASS |
| t5 | W0/S5 is designated | W0/S3: NG |
| t6 | W0 → "processed" is detected W1/S0 is designated | W0/S4: (Don't care) (W0 processed) |
| t7 | W1/S1 is designated | W0/S5: (Don't care) (W0 processed) |
| t8 | W1/S2 is designated | W1/S0: PASS |
| t9 | W1/S3 is designated | W1/S1: NG |
| t10 | W1 → "processed" is detected W2/S0 is designated | W1/S2: (Don't care) (W1 processed) |
| t11 | W2/S1 is designated | W1/S3: (Don't care) (W1 processed) |
| t12 | W2/S2 is designated | W2/S0: NG |
| t13 | Termination of processes for window image group is detected | W2/S1: (Don't care) (W2 processed) |
| t14 | (Next window image group is processed) | W2/S2: (Don't care) (W2 processed) |

In the example of Table 2, termination of processes for a window image group is detected at time t13 in method 1.

The case in Table 1 is processed according to method 2, as shown in Table 3. Table 3 lists the times and the processes of the instruction unit and determination unit for processes according to method 2. The notation of Table 3 is the same as that of Table 2.

TABLE 3

Processes According to Method 2 in FIG. 12

| Time | Instruction Unit | Determination Unit |
|---|---|---|
| t0 | W0/S0 is designated | |
| t1 | W1/S0 is designated | |
| t2 | W2/S0 is designated | W0/S0: PASS |
| t3 | W0/S1 is designated | W1/S0: PASS |
| t4 | W1/S1 is designated | W2/S0: NG |
| t5 | | W0/S1: PASS |
| t6 | (W0/S1: PASS is received) W0/S2 is designated | W1/S1: NG |
| t7 | | |
| t8 | | W0/S2: PASS |
| t9 | W0/S3 is designated | |
| t10 | | |
| t11 | | W0/S3: NG |
| t12 | Termination of processes for window image group is |

TABLE 3-continued

Processes According to Method 2 in FIG. 12

| Time | Instruction Unit | Determination Unit |
|------|------------------|--------------------|
|      | detected         |                    |
| t13  | (Next window image group is processed) |        |
| t14  | (Next window image group is processed) |        |

In the example of Table 3, termination of processes for a window image group is detected at time t12 in method 2.

Figure 18A:
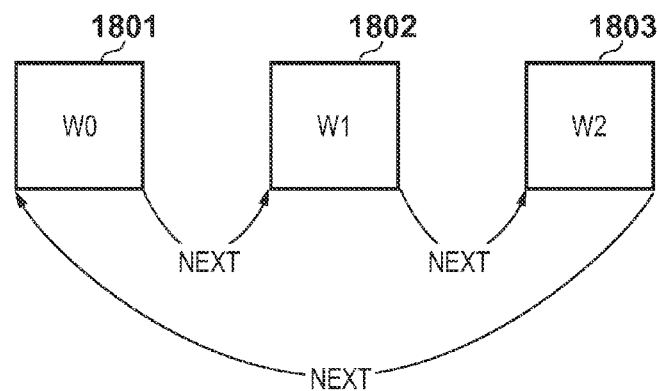
FIGS. 18A to 18C are views exemplifying the execution order of a classification process for window images.
Figure 18B:
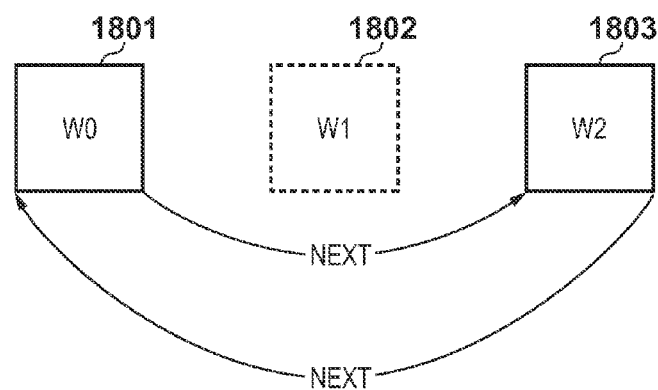
Figure 18C:
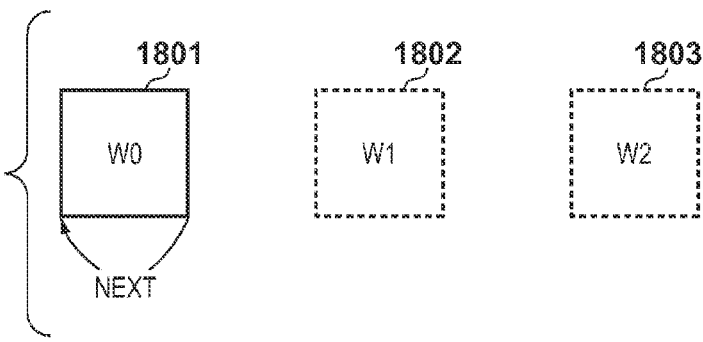

Next, method 3 in FIG. 12 will be explained. This method defines an order in which window images are processed. The instruction unit 101 can set the classification process execution order for a plurality of window images in accordance with an external control input. The set execution order is contained in a classification job and transmitted from the instruction unit 101 to the calculation unit 103. The calculation unit 103 executes a classification process for a plurality of window images (partial images) in accordance with the execution order contained in the classification job. FIGS. 18A to 18C are views exemplifying the classification process execution order for window images. FIGS. 18A to 18C exemplify three window images W0 to W2 in accordance with the example of FIG. 12. Window images 1801 to 1803 in FIGS. 18A to 18C correspond to the window images W0 to W2 in FIG. 12. In FIGS. 18A to 18C, a rectangle of a solid line represents an unprocessed window image, and a rectangle of a broken line represents a processed window image. Note that the number of window images is not limited to three. It is obvious that the circulation order can be defined for four or more window images.

FIG. 18A exemplifies a state in which all window images have not been processed. A weak classifier which performs a classification process will be referred to as a weak classifier Si. A window image to be processed first by the weak classifier Si is the window image W0 1801. The window image W1 1802 is processed next to the window image W0 1801. The window image W2 1803 is processed next to the window image W1 1802. If the process for the window image W0 1801 to window image W2 1803 is not completed in the classification process by the weak classifier Si, the window image W0 1801 to window image W2 1803 are processed by the next weak classifier Si+1. The window image W0 1801, window image W1 1802, and window image W2 1803 are processed in the circulation order from the window image W0 1801 which comes next to the window image W2 1803. FIG. 18B exemplifies a state in which the window image W1 1802 has been processed. The processed window image W1 1802 is excluded from targets of the next classification process. When a plurality of window images (partial images) includes at least one window image (partial image) for which it is determined to abort (terminate) the classification process, the instruction unit 101 sets a new execution order (W0→W2) excluding the window image (for example, W1). In this case, the window image W2 1803 is processed next to the window image W0 1801. FIG. 18C exemplifies a case in which only one window image remains unprocessed. For example, when the process for the window image W0 1801 is not completed in the classification process by the weak classifier Si, the target of a classification process by the next weak classifier Si+1 is also the window image W0 1801.

The case in Table 1 is processed according to method 3, as shown in Table 4. Table 4 lists the times and the processes of the instruction unit and determination unit for processes according to method 3. The notation of Table 4 is the same as that of Table 2.

TABLE 4

Processes According to Method 3 in FIG. 12

| Time | Instruction Unit | Determination Unit |
|------|------------------|--------------------|
| t0   | W0/S0 is designated |                 |
| t1   | W1/S0 is designated |                 |
| t2   | W2/S0 is designated | W0/S0: PASS     |
| t3   | W0/S1 is designated | W1/S0: PASS     |
| t4   | W1/S1 is designated | W2/S0: NG       |
| t5   | (Termination of processes for W2 is detected) W0/S2 is designated | W0/S1: PASS |
| t6   | W1/S2 is designated | W1/S1: NG       |
| t7   | (Termination of processes for W1 is detected) W0/S3 is designated | W0/S2: PASS |
| t8   | W0/S4 is designated | W1/S2: (Don't care) (W1 processed) |
| t9   | W0/S5 is designated | W0/S3: NG       |
| t10  | Termination of processes for window image group is detected | W0/S4: (Don't care) (W0 processed) |
| t11  | (Next window image group is processed) | W0/S5: (Don't care) (W0 processed) |
| t12  | (Next window image group is processed) | (Next window image group is processed) |
| t13  | (Next window image group is processed) | (Next window image group is processed) |
| t14  | (Next window image group is processed) | (Next window image group is processed) |

The window image W2 is processed next to the window image W1 for which the classification job by the weak classifier S1 is designated at time t4. At time t5, the instruction unit 101 has already learned, from the determination result (NG) of W2/S0 at time t4, that the classification process for the window image W2 has terminated. In this case, the instruction unit 101 further searches for the next window image W0. Since the window image W0 has not been processed, the instruction unit 101 designates again the classification job for W0/S2 (t5).

Similarly, at time t8, the window image W1 is processed next to the window image W0 for which the classification job by the weak classifier S3 is designated again at time t7. The determination result (NG) of W1/S1 at time t6 reveals that the classification process for the window image W1 has terminated. At times t7 and t8, classification processes for the window image for which no classification process has terminated are sequentially designated (W0/S3 and W0/S4). At this time, the window images W1 and W2 are excluded from classification targets. At time t9, the determination unit 104 finalizes the determination result (NG) of W0/S3. At time t10, the instruction unit 101 detects termination of processes for the window image group. As described above, in the example of FIG. 12, method 3 according to the embodiment of the present invention can process a window image group fastest.

As another example, FIG. 13 shows an example in which it is determined that all the window images W0 to W2 contain a detection target object (specific pattern), as shown in Table 5.

TABLE 5

Determination Results in FIG. 13

| Window Image ID | Final Weak Classifier ID | Determination Result |
|---|---|---|
| W0 | S5 | PASS (OK) |
| W1 | S5 | PASS (OK) |
| W2 | S5 | PASS (OK) |

In the case of FIG. 13, the instruction unit 101 detects at time t20 that processes for the window image group have terminated in all the three methods. In this example, the process speed does not differ between the three methods.

Figure 14:
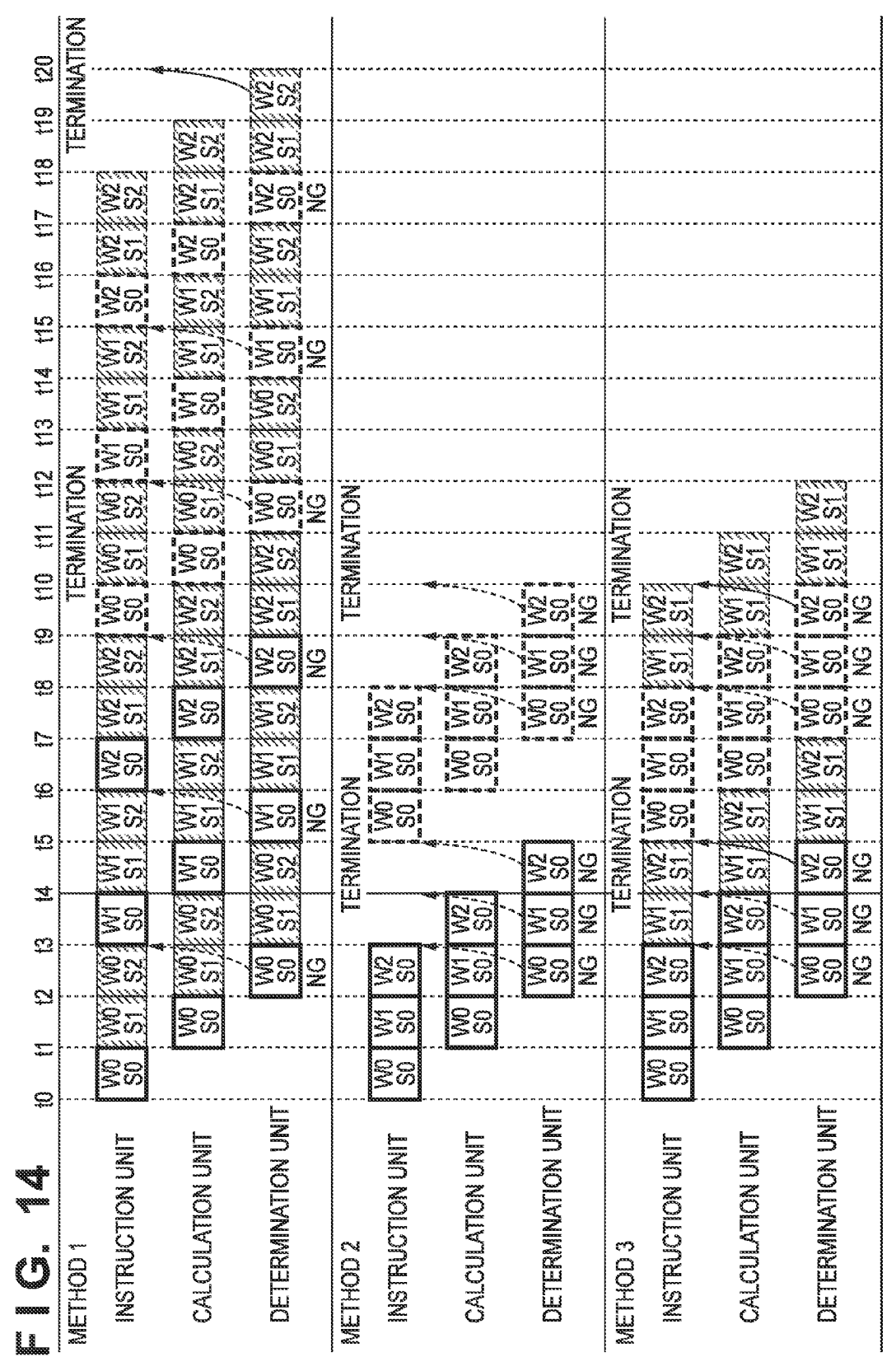

As still another example, FIG. 14 shows an example in which the first weak classifier S0 determines NG for all the window images W0 to W2, as shown in Table 6.

TABLE 6

Determination Results in FIG. 14

| Window Image ID | Final Weak Classifier ID | Determination Result |
|---|---|---|
| W0 | S0 | NG |
| W1 | S0 | NG |
| W2 | S0 | NG |

The case in Table 6 is processed according to method 1, as shown in Table 7. Table 7 lists the times and the processes of the instruction unit and determination unit for processes according to method 1. The notation of Table 7 is the same as that of Table 2.

TABLE 7

Processes According to Method 1 in FIG. 14

| Time | Instruction Unit | Determination Unit |
|---|---|---|
| t0 | W0/S0 is designated | |
| t1 | W0/S1 is designated | |
| t2 | W0/S2 is designated | W0/S0: NG |
| t3 | W1/S0 is designated | W0/S1: (Don't care) (W0 processed) |
| t4 | W1/S1 is designated | W0/S2: (Don't care) (W0 processed) |
| t5 | W1/S2 is designated | W1/S0: NG |
| t6 | W2/S0 is designated | W1/S1: (Don't care) (W1 processed) |

TABLE 7-continued

Processes According to Method 1 in FIG. 14

| | | (W1 processed) |
|---|---|---|
| t7 | W2/S1 is designated | W1/S2: (Don't care) (W1 processed) |
| t8 | W2/S2 is designated | W2/S0: NG |
| t9 | Termination of processes for window image group is detected | W2/S1: (Don't care) (W2 processed) |
| t10 | (Next window image group is processed) | W2/S2: (Don't care) (W2 processed) |

As represented in Table 7, in method 1, the instruction unit 101 detects at time t9 that processes for the group of window images W0 to W2 have terminated.

The case in Table 6 is processed according to method 2, as shown in Table 8. Table 8 lists the times and the processes of the instruction unit and determination unit for processes according to method 2. The notation of Table 8 is the same as that of Table 2.

TABLE 8

Processes According to Method 2 in FIG. 14

| Time | Instruction Unit | Determination Unit |
|---|---|---|
| t0 | W0/S0 is designated | |
| t1 | W1/S0 is designated | |
| t2 | W2/S0 is designated | W0/S0: NG |
| t3 | | W1/S0: NG |
| t4 | | W2/S0: NG |
| t5 | Termination of processes for window image group is detected | |
| t6 | (Next window image group is processed) | |
| t7 | (Next window image group is processed) | (Next window image group is processed) |
| t8 | (Next window image group is processed) | (Next window image group is processed) |
| t9 | (Next window image group is processed) | (Next window image group is processed) |
| t10 | (Next window image group is processed) | (Next window image group is processed) |

As represented in Table 8, in method 2, the instruction unit 101 detects at time t5 that processes for the group of window images W0 to W2 have terminated.

The case in Table 6 is processed according to method 3, as shown in Table 9. Table 9 lists the times and the processes of the instruction unit and determination unit for processes according to method 3. The notation of Table 9 is the same as that of Table 2.

TABLE 9

Processes According to Method 3 in FIG. 14

| Time | Instruction Unit | Determination Unit |
|------|------------------|--------------------|
| t0 | W0/S0 is designated | |
| t1 | W1/S0 is designated | |
| t2 | W2/S0 is designated | W0/S0: NG |
| t3 | Termination of processes for W0 is detected / W1/S1 is designated | W1/S0: NG |
| t4 | Termination of processes for W1 is detected / W2/S2 is designated | W2/S0: NG |
| t5 | Termination of processes for window image group is detected | W1/S1: (Don't care) (W1 processed) |
| t6 | (Next window image group is processed) | W1/S1: (Don't care) (W2 processed) |
| t7 | (Next window image group is processed) | (Next window image group is processed) |
| t8 | (Next window image group is processed) | (Next window image group is processed) |
| t9 | (Next window image group is processed) | (Next window image group is processed) |
| t10 | (Next window image group is processed) | (Next window image group is processed) |

As represented in Table 9, in method 3, the instruction unit 101 detects at time t5 that processes for the group of window images W0 to W2 have terminated. Method 3 can detect termination of processes for the window image group at the same time t5 as that by method 2. Also, method 3 can process a window image group faster than method 1.

Figure 15:
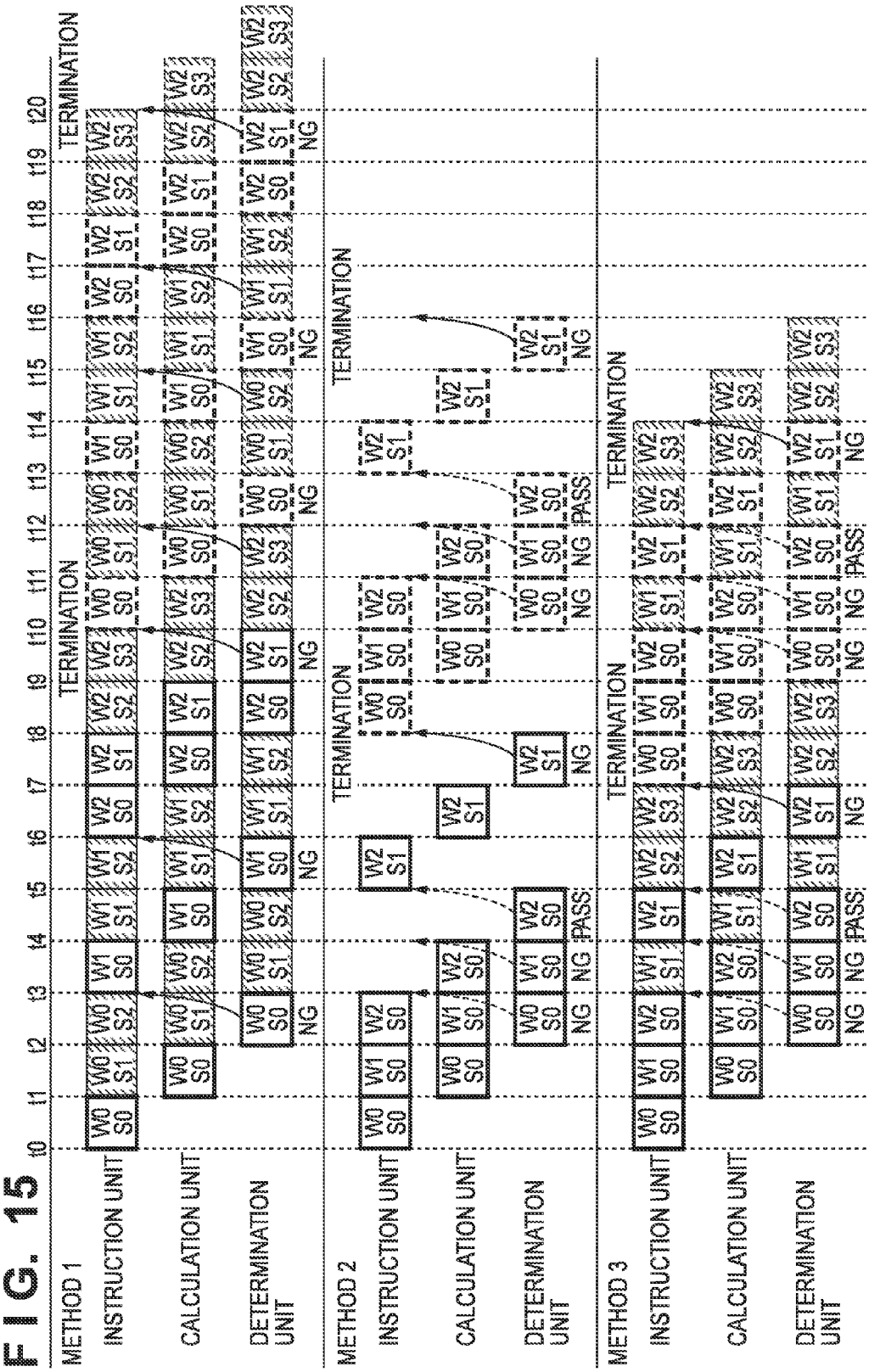
FIG. 15 is a view exemplifying a process by the weak classifier.

As still another example, FIG. 15 shows an example in which the first weak classifier S0 determines NG for the window images W0 and W1 out of the window images W0 to W2 and only one window image remains unprocessed, as represented in Table 10.

TABLE 10

Determination Results in Example of FIG. 15

| Window Image ID | Final Weak Classifier ID | Determination Result |
|-----------------|--------------------------|----------------------|
| W0 | S0 | NG |
| W1 | S0 | NG |
| W2 | S1 | NG |

The case in Table 10 is processed according to method 1, as shown in Table 11. Table 11 lists the times and the processes of the instruction unit and determination unit for processes according to method 1. The notation of Table 11 is the same as that of Table 2.

TABLE 11

Processes According to Method 1 in FIG. 15

| Time | Instruction Unit | Determination Unit |
|------|------------------|--------------------|
| t0 | W0/S0 is designated | |
| t1 | W0/S1 is designated | |
| t2 | W0/S2 is designated | W0/S0: NG |
| t3 | W1/S0 is designated | W0/S1: (Don't care) (W0 processed) |
| t4 | W1/S1 is designated | W0/S2: (Don't care) (W0 processed) |
| t5 | W1/S2 is designated | W1/S0: NG |
| t6 | W2/S0 is designated | W1/S1: (Don't care) (W1 processed) |
| t7 | W2/S1 is designated | W1/S2: (Don't care) (W1 processed) |
| t8 | W2/S2 is designated | W2/S0: PASS |
| t9 | W2/S3 is designated | W2/S1: NG |
| t10 | Termination of processes for window image group is detected | W2/S2: (Don't care) (W2 processed) |

As represented in Table 11, in method 1, the instruction unit 101 detects at time t10 that processes for the group of window images W0 to W2 have terminated.

The case in Table 10 is processed according to method 2, as shown in Table 12. Table 12 lists the times and the processes of the instruction unit and determination unit for processes according to method 2. The notation of Table 12 is the same as that of Table 2.

TABLE 12

Processes According to Method 2 in FIG. 15

| Time | Instruction Unit | Determination Unit |
|------|------------------|--------------------|
| t0 | W0/S0 is designated | |
| t1 | W1/S0 is designated | |
| t2 | W2/S0 is designated | W0/S0: NG |
| t3 | | W1/S0: NG |
| t4 | | W2/S0: PASS |
| t5 | W2/S1 is designated | |
| t6 | | |
| t7 | | W2/S1: NG |
| t8 | Termination of processes for window image group is detected | |
| t9 | (Next window image group is processed) | |
| t10 | (Next window image group is processed) | (Next window image group is processed) |

As represented in Table 12, in method 2, the instruction unit 101 detects at time t8 that processes for the group of window images W0 to W2 have terminated.

The case in Table 10 is processed according to method 3, as shown in Table 13. Table 13 lists the times and the processes of the instruction unit and determination unit for processes according to method 3. The notation of Table 13 is the same as that of Table 2.

TABLE 13

Processes According to Method 3 in FIG. 15

| Time | Instruction Unit | Determination Unit |
|---|---|---|
| t0 | W0/S0 is designated | |
| t1 | W1/S0 is designated | |
| t2 | W2/S0 is designated | W0/S0: NG |
| t3 | (Termination of processes for W1 is detected) W1/S1 is designated | W1/S0: NG |
| t4 | (Termination of processes for W1 is detected) W2/S1 is designated | W2/S0: PASS |
| t5 | W2/S2 is designated | W1/S1: (Don't care) (W1 processed) |
| t6 | W2/S3 is designated | W2/S1: NG |
| t7 | Termination of processes for window image group is detected | W2/S2: (Don't care) (W2 processed) |
| t8 | (Next window image group is processed) | W2/S3: (Don't care) (W2 processed) |
| t9 | (Next window image group is processed) | (Next window image group is processed) |
| t10 | (Next window image group is processed) | (Next window image group is processed) |

As represented in Table 13, in method 3, the instruction unit 101 detects at time t7 that processes for the group of window images W0 to W2 have terminated. Method 3 can process a window image group faster than methods 1 and 2.

In the examples shown in FIGS. 12 to 15, method 3 can process a window image group at a speed equal to or higher than those by methods 1 and 2.

The memory 102 holds image data of a still image in the embodiment, but may hold moving image data. A plurality of frames can be stored in the memory 102, referred to, and processed. The memory 102 is not limited to one formed from a single memory, but may be formed from a plurality of memories. For example, three memories may form the memory 102, and store a frame of interest and preceding and succeeding frames, respectively. In this case, when the calculation unit 103 executes the classification process for the respective memories, association information for associating a window image in each memory with a parameter to be referred to in the classification process is supplied to the parameter supply unit 105. When supplying a parameter to the calculation unit 103, the parameter supply unit 105 also supplies the association information to the calculation unit 103. By referring to this association information, the calculation unit 103 determines the association with each memory, and specifies a parameter to be referred to in the classification process for the window image.

The embodiment has exemplified a still image as two-dimensional data defined by spatial axes, and a moving image as three-dimensional data defined by further adding the time axis. The present invention is also applicable to multi-dimensional data or one-dimensional data such as audio (for audio, data may be two-dimensional by adding the time axis). In the embodiment, a specific object is detected. However, for general multi-dimensional data, this corresponds to detection of a specific pattern of the multi-dimensional data.

In the embodiment, the memory 102 holds image data. For example, as a pre-process, a feature amount (for example, edge amount or inter-frame difference) may be extracted and held in the memory. Note that the feature amount is not limited to one type. For example, a plurality of feature amounts can be extracted from one image and used to perform the determination process. In this case, similar to moving image data, information representing a feature amount to be referred to is added to a parameter held in the parameter holding unit, and data to be referred to by the calculation unit 103 is specified based on the information. Further, the memory 102 holds general image data in the embodiment, but can hold image data in the form of an integral image.

As described above, the embodiment can efficiently perform a classification process for input image data by series-connecting a plurality of weak classifiers.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-118396, filed May 26, 2011, which is hereby incorporated by reference herein in its entirety.

What is claimed is:

1. An image processing apparatus comprising:
an instruction unit adapted to designate one of a plurality of partial images and instruct execution of one of a plurality of processes for a classification process to determine whether the designated partial image contains a specific pattern;
an execution unit adapted to perform, in accordance with the instruction from said instruction unit, the instructed process for the designated partial image using parameters for the classification process, including a threshold for determining whether to continue or terminate the classification process; and
a determination unit adapted to determine, based on a result of execution by said execution unit, whether the classification process for the designated partial image has terminated, wherein when said determination unit determines that the classification process has not terminated for at least one of the plurality of partial images, said instruction unit designates one of the partial images for which the classification process are determined not to have terminated and outputs a re-instruction for execution of unexecuted one of the plurality of processes for the designated partial image, and in accordance with the re-instruction, said execution unit executes, using parameters different from the parameters previously used, the instructed process for the designated partial image.

2. The apparatus according to claim 1, wherein the plurality of processes for the classification process correspond to classification processes by different weak classifiers, and said instruction unit designates one of the weak classifiers.

3. The apparatus according to claim 2, wherein said instruction unit sets an execution order for the weak classifiers, and designates one of the weak classifiers in accordance with the execution order.

4. The apparatus according to claim 1, wherein when said determination unit determines that the classification process has terminated for all the plurality of partial images, said instruction unit terminates the classification process for the plurality of partial images.

5. The apparatus according to claim 1, further comprising a storage unit adapted to acquire image data from outside in accordance with an instruction from said instruction unit, and store the acquired image data, wherein said execution unit acquires, from said storage unit for the classification process, one of a plurality of partial images which form the image data.

6. The apparatus according to claim 5, wherein after said determination unit determines that the classification process has terminated for all the plurality of partial images, said instruction unit instructs said storage unit to replace the image data, and said storage unit acquires new image data in accordance with the instruction to replace the image data, and stores the acquired image data.

7. The apparatus according to claim 1, wherein said instruction unit sets an execution order of the classification process for the plurality of partial images, and said instruction unit designates one of the plurality of partial images in accordance with the execution order.

8. An image data processing method to be executed by an image processing apparatus, comprising:

an instruction step of designating one of a plurality of partial images and instructing execution of one of a plurality of processes for a classification process to determine whether the designated partial image contains a specific pattern;

an execution step of performing, in accordance with the instruction in the instruction step, the instructed process for each of the designated partial image using parameters for the classification process, including a threshold for determining whether to continue or terminate the classification process; and a determination step of determining, based on a result of execution in the execution step, whether the classification process for the designated partial image has terminated, wherein in the instruction step, when the classification process is determined in the determination step not to have terminated for at least one of the plurality of partial images, one of the partial images for which the classification process are determined not to have terminated is designated and a re-instruction for execution of unexecuted one of the plurality of processes for the designated partial image is output, and in the execution step, in accordance with the re-instruction, the instructed process for the designated partial image is executed using parameters different from the parameters previously used.

9. A non-transitory computer readable storage medium storing a program for causing a computer to execute an image data processing method defined in claim 8.

10. The apparatus according to claim 1, wherein said instruction unit sets a first execution order for the weak classifiers, and designates one of the weak classifiers in accordance with the first execution order, and said instruction unit sets a second execution order of for the plurality of partial images, and designates one of the plurality of partial images in accordance with the second execution order.

11. The apparatus according to claim 10, wherein said instruction unit designates one of the plurality of partial images in accordance with the second execution order for the designated one of classifiers.

12. The apparatus according to claim 10, wherein when the determination unit determines that the classification process has terminated for one of the plurality of partial images, said instruction unit designates one of remaining partial images in accordance with the second execution order.

13. The apparatus according to claim 12, wherein when said instruction unit has designated all of the remaining partial images for a process of the designated one of classifiers, said instruction unit designates a next one of the weak classifiers in accordance with the first execution order, and designates a first one of the remaining partial images in accordance with the second execution order.

14. The apparatus according to claim 13, wherein said instruction unit designates the first one of the remaining partial images for next one of the weak classifiers in advance of completing the process of a current one of classifiers.

* * * * *